United States Patent
Hale et al.

(10) Patent No.: US 9,678,721 B2
(45) Date of Patent: Jun. 13, 2017

(54) IMPLICIT SOFTWARE DEPENDENCY ANALYSIS

(71) Applicant: SEMMLE LIMITED, Oxford (GB)

(72) Inventors: Joshua George Hale, Oxford (GB); Luke James Cartey, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/090,468

(22) Filed: Apr. 4, 2016

(65) Prior Publication Data
US 2017/0090877 A1    Mar. 30, 2017

Related U.S. Application Data

(62) Division of application No. 14/871,983, filed on Sep. 30, 2015, now Pat. No. 9,411,707.

(60) Provisional application No. 62/234,939, filed on Sep. 30, 2015.

(51) Int. Cl.
| G06F 9/44 | (2006.01) |
| G06F 9/45 | (2006.01) |
| G06F 11/36 | (2006.01) |

(52) U.S. Cl.
CPC ............ *G06F 8/22* (2013.01); *G06F 11/3604* (2013.01)

(58) Field of Classification Search
None
See application file for complete search history.

(56) References Cited

U.S. PATENT DOCUMENTS

| 5,692,184 A | 11/1997 | Ardoin et al. |
| 6,128,773 A | 10/2000 | Snider |
| 7,058,928 B2 | 6/2006 | Wygodny |
| 7,409,679 B2 | 8/2008 | Chedgey et al. |
| 7,680,818 B1 | 3/2010 | Fan et al. |
| 7,810,079 B2 | 10/2010 | Cates |
| 8,286,142 B2 | 10/2012 | Fjeldstad |
| 8,533,682 B2 | 9/2013 | Kakulamarri |

(Continued)

OTHER PUBLICATIONS

Moor et al., "Keynote Address: .QL for Source Code Analysis," Seventh IEEE International Working Conference on Source Code Analysis and Manipulation, Paris, France, Sep. 30, 2007-Oct. 1, 2007, 12 pages.

(Continued)

*Primary Examiner* — Insun Kang

(74) *Attorney, Agent, or Firm* — Fish & Richardson P.C.

(57) ABSTRACT

Methods, systems, and apparatus, including computer programs encoded on computer storage media, for generated aggregated dependencies between software elements in a code base. One of the methods includes receiving a request to generate implicit dependencies introduced by remote procedure calls in a project. A registration of a remote procedure call is identified, wherein the registration of the remote procedure call specifies a target function and a name for the remote procedure call. An invocation of the remote procedure call using the name for the remote procedure call is identified, wherein the invocation occurs in a source software element of the project. A definition of the target function of the remote procedure call is identified, wherein the target function is defined in a target software element of the project. A new dependency is generated, the new dependency being a dependency from the source software element to the target software element.

21 Claims, 37 Drawing Sheets

(56) References Cited

U.S. PATENT DOCUMENTS

| | | |
|---|---|---|
| 8,788,884 B2 | 7/2014 | Perkins |
| 8,823,709 B2 | 9/2014 | Grandhi et al. |
| 8,843,526 B2 | 9/2014 | Stoeck |
| 8,887,156 B2 | 11/2014 | Chambers |
| 9,230,099 B1 | 1/2016 | McCorkendale |
| 9,323,644 B1 | 4/2016 | Hale |
| 2003/0121024 A1* | 6/2003 | Hill .................. G06F 8/71 717/107 |
| 2006/0048093 A1 | 3/2006 | Jain |
| 2007/0156644 A1* | 7/2007 | Johnson ............. G06F 21/577 |
| 2008/0134138 A1* | 6/2008 | Chamieh ............ G06F 9/4428 717/105 |
| 2008/0134152 A1* | 6/2008 | Edde ................. G06F 9/4428 717/135 |
| 2008/0201705 A1* | 8/2008 | Wookey ............. G06F 8/68 717/175 |
| 2009/0204944 A1* | 8/2009 | Williams ............ G06F 8/65 717/121 |
| 2009/0210750 A1 | 8/2009 | Cates |
| 2009/0300151 A1* | 12/2009 | Friedman ........... G06F 11/3664 709/222 |
| 2010/0083230 A1 | 4/2010 | Ramakrishnan |
| 2010/0269121 A1 | 10/2010 | Montesissa |
| 2011/0067018 A1* | 3/2011 | Kawachiya ......... G06F 8/433 717/156 |
| 2012/0151198 A1* | 6/2012 | Gupta ............... G06F 9/45558 713/2 |
| 2012/0151419 A1 | 6/2012 | Kent et al. |
| 2012/0272228 A1 | 10/2012 | Marndi et al. |
| 2013/0212563 A1* | 8/2013 | Kraft ................ G06F 8/75 717/123 |
| 2014/0096117 A1 | 4/2014 | Tanaka |
| 2014/0109106 A1 | 4/2014 | Fanning |
| 2014/0130020 A1 | 5/2014 | Boshernitsan |
| 2014/0310697 A1* | 10/2014 | Reddish ............. G06F 9/4443 717/154 |
| 2015/0067654 A1 | 3/2015 | Seto |
| 2015/0143339 A1 | 5/2015 | Rajanna |
| 2016/0196201 A1 | 7/2016 | Seto |

OTHER PUBLICATIONS

Stuedi et al., "DaRPC: Data Center RPC," SOCC '14 Proceedings of the ACM Symposium on Cloud Computing, Nov. 2014, pp. 1-13.

Wang et al., "Matching dependence-related queries in the system dependence graph," ASE '10 Proceedings of the IEEE/ACM international conference on Automated software engineering, Sep. 2010, pp. 457-466.

* cited by examiner

Explorer

- Users
  - tmp
    - even-or-odd
      - even.c
      - even.h
      - main.c
      - odd.c
      - odd.h
- usr

Architecture | Dependency | Tangle | Focus | Cycle | Clustering | Source Code even.c /Users/tmp/even-or-odd/even.c

```
1   #include <stdio.h>
2   #include "odd.h"
3
4   int even (int x) {
5       if (x == 0)
6           return 1;
7       if (x > 0)
8           return odd(x-1);
9       else
10          return odd(x+1);
11      }
12
13
```

640

642

Dependency Details | Aggregated Dependency Details | Explanation | Rules even.c depends on odd.c:

| Dependency origin | Line no. | Dependency target |
|---|---|---|
| ○ definition of even(int x) | 10 | ○ definition of odd(int x) |
| ○ definition of even(int x) | 8 | ○ definition of odd(int x) |

IMPLICIT SOFTWARE DEPENDENCY ANALYSIS

CROSS REFERENCE TO RELATED APPLICATIONS

This application is a divisional application of U.S. patent application Ser. No. 14/871,983, filed on Sep. 30, 2015, entitled "Implicit Software Dependency Analysis", which claims the benefit under 35 U.S.C. §119(e) of the filing date of U.S. Provisional Patent Application No. 62/234,939, filed on Sep. 30, 2015, entitled "Hierarchical Dependency Analysis of Source Code." The entire contents of the prior applications are hereby incorporated by reference.

BACKGROUND

This specification relates to static analysis of computer software source code.

Static analysis refers to techniques for analyzing computer software source code without executing the source code as a computer software program.

Source code is typically maintained by developers in a code base, which may be referred to as a project. Developers can maintain the source code of the project using a version control system. Version control systems generally maintain multiple revisions of the source code in the code base, each revision being referred to as a snapshot. Each snapshot includes the source code of files of the code base as the files existed at a particular point in time.

Cyclic dependencies are a common problem in large code bases. A cyclic dependency occurs, for example, when a first software package depends on a second software package, the second software package depends on a third software package, and the third software package depends on the first software package. Cyclic dependencies make code bases harder to maintain because a change to any one software package in the cycle can require changes to each and every other software package in the cycle.

Dependencies in source code can be represented as a directed graph. However, as code bases become larger and larger, visualizations of the raw dependencies between source code elements, which can number many millions in large code bases, tend to be less useful.

SUMMARY

This specification describes how a static analysis system can generate aggregated dependencies among software elements in a code base. The system can use the aggregated dependencies to generate interactive user interface presentations for visualizing the structure and cyclic dependencies in a code base.

Particular embodiments of the subject matter described in this specification can be implemented so as to realize one or more of the following advantages. Users can gain an intuitive understanding of the structure and function of a complex software system by browsing interactive visualizations of an aggregated dependency graph. The interactive visualizations allow users to interactively explore complex software systems. The interactive visualizations help users to identify the causes of unnecessary complexity in software systems, and to develop solutions for reducing that complexity. The intuitive interactive visualizations can be integrated into existing coding tools to provide immediate and intuitive guidance on the design of a complex software system as the system is being built. The aggregated dependency information provides users with an intuitive sense for how hard it would be to remove or rearrange certain dependencies from the code base. The computation of aggregated dependencies allows users to create model architectures with associated rules that help developers modify a code base toward the model architecture.

A static analysis system can provide highly customizable definitions of dependencies by using queries to define the dependencies. Using queries to define dependencies provides a natural mechanism for rich dependency categorization. In addition, using queries is typically faster and clearer than specifying dependencies using a general purpose programming language. Furthermore, using queries makes the system easier to update or extend to support new language features. The rich categorization of dependencies can be used in an interactive presentation of aggregated dependencies. For example, different categories of dependencies can be visually distinguished in the presentation. Furthermore, some categories of queries can be turned on or off. A dependency analysis query can operate over a full program database, which can contain the entire program. Thus it is possible to perform global dependency analysis.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 6A-6L illustrate example user interface presentations of aggregated dependency graphs.

Like reference numbers and designations in the various drawings indicate like elements.

DETAILED DESCRIPTION

This specification describes static analysis techniques for generating visualizations of aggregated dependencies between software elements in a project. Large code bases can include millions of software elements and millions of corresponding dependencies between software elements. Therefore, it is often impractical for a static analysis system to present visualizations of raw dependencies in the code base.

Instead, a static analysis system can aggregate dependencies between software elements and present visualizations of the aggregated dependencies. An aggregated dependency between software elements merges information from two different types of relationships between software elements: (1) dependency relationships and (2) hierarchical relationships. The visualizations of the aggregated dependencies assist a user in understanding the structure of the code base without overwhelming the user with raw dependency information.

In this specification, the term "software element" refers broadly to any discrete part of a software system. A software element may be a source code element, e.g., a variable, function, class, or type. Software elements may also be build system elements, including files, directories, libraries, and packages. The definition of what software elements exist in a project is flexible. The software elements that are defined to exist in a project can thus vary according to different programming languages, different build systems, and different user-supplied definitions of software elements.

Figure 1A:
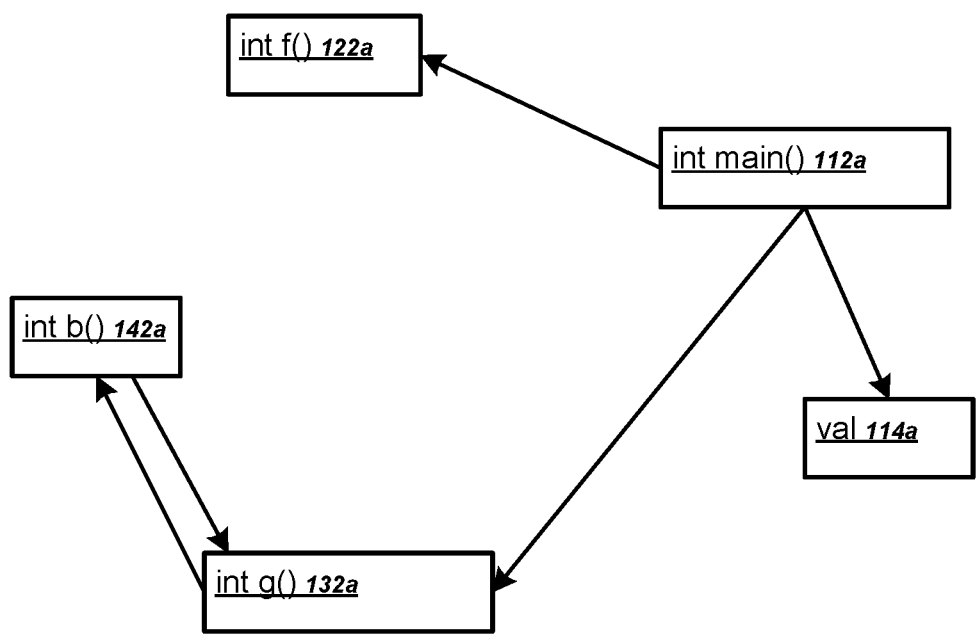
FIG. 1A illustrates an example dependency graph

FIG. 1A illustrates an example dependency graph 100a. The dependency graph 100a represents dependency relationships in a highly simplified example project. Even in this highly simplified example, the dependency graph 100a can appear quite complex.

The example project includes the following source code files, main.c, f h, f.c, g.h, g.c, a.h, and a.c.

The main.c source code file includes the following source code:

```
#include f.h
#include g.h
const int val = 2;
int main( ) {
    int y = g(val) + f(1)
    printf( y )
}
```

The H1 source code file includes the following source code:
int f(int z);
The f.c source code file includes the following source code:

```
int f(int z) {
    return z + 1
}
```

The g.h source code file includes the following source code:
int g(int a);
The g.c source code file includes the following source code:

```
int g(int a) {
    return b(a) + 1
}
```

The a.h source code file includes the following source code:
int b(int e);
The a.c source code file includes the following source code:

```
#include g.h
int b(e) {
    return g(e) + 1
}
```

A dependency relationship, or for brevity, a "dependency" or a "software dependency" represents a functional relationship between two software elements. A dependency can be described as representing that one software element depends on another software element. Thus, a software element A can be considered to depend on a software element B when the software element A functions as intended only if the software element B is also available. For example, a source code file may not compile correctly if a header included by the source code file is not available.

In FIG. 1A, for example, an "int main( )" node 112a that represents the function "main( )" in main.c depends on a "val" node 114a that represents the variable "val" in main.c.

The "int main( )" node 112a also depends on an "int f( )" node 122a representing the function "int f( )" that is called from the function "int main( ). The "int main( )" node 112a also depends on an "int go" node 132a representing the function "int go" called from the function "int main( )" in main.c.

The "int go" node 132a depends on an "int b( )" node 142a that represents the function "int b( )" called from the function "int go." Similarly, The "int b( )" node 142a depends on an "int go" node 132a that represents the function "int go" called from the function "int b( )."

The definition of which software elements depend on which other software elements is flexible. The dependency relationships in a project can thus vary according to different programming languages, different build systems, and different user-supplied definitions of dependencies. For example, some programming languages are interpreted rather than compiled. Thus, dependences in interpreted programming languages represent run-time dependencies rather than compile-time dependencies.

The dependency relationships may be collectively referred to as a raw dependency graph. The term "raw dependency graph" is intended to distinguish the dependency relationships from aggregated dependencies, which may be collectively referred to or visualized as an aggregated dependency graph. The raw dependency graph and the aggregated dependency graph are both directed graphs that can include cycles.

Figure 1B:
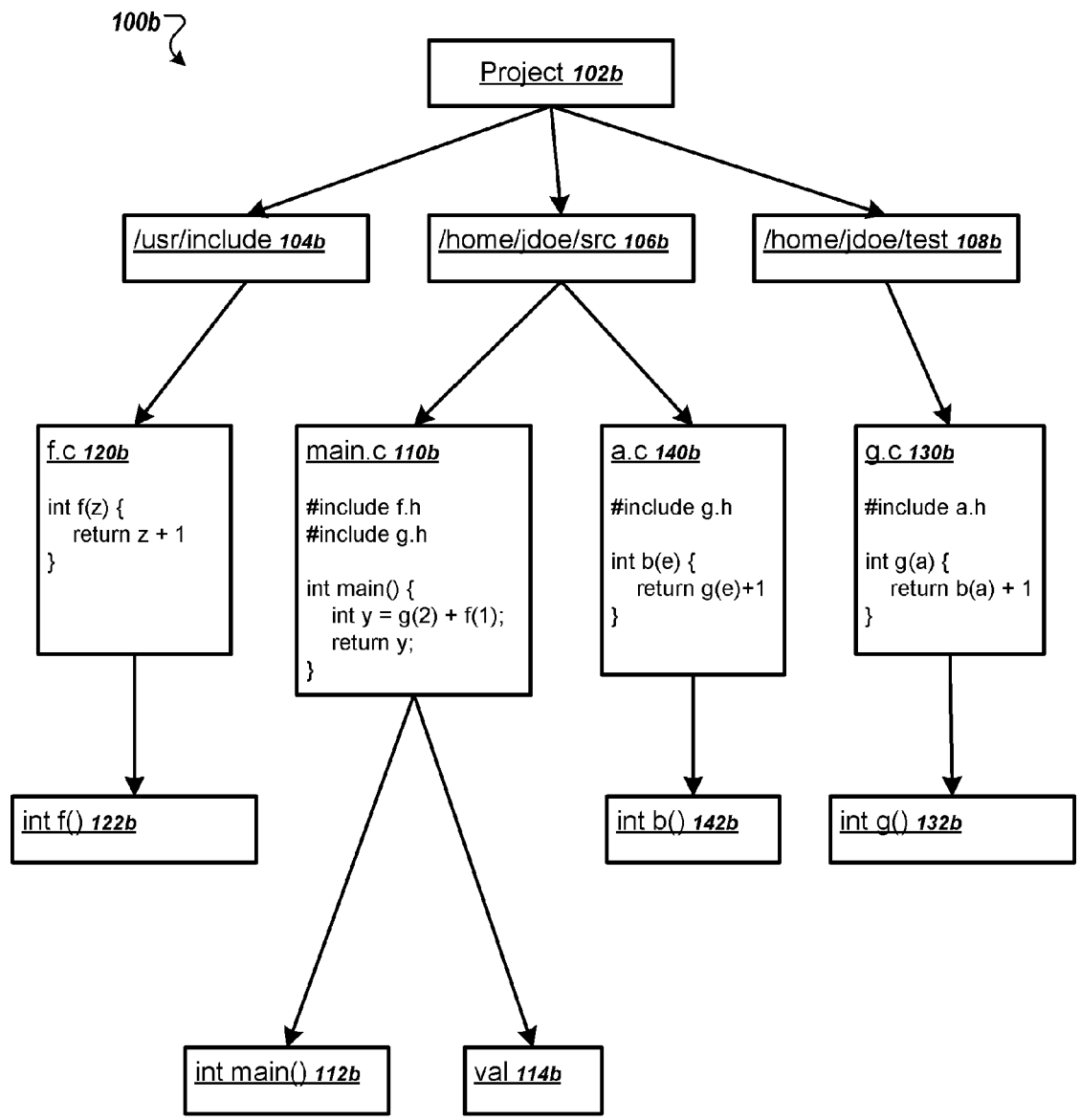
FIG. 1B illustrates an example hierarchy graph.

FIG. 1B illustrates an example hierarchy graph 100*b*. The hierarchy graph 100*b* represents hierarchical relationships in the example project of FIG. 1A.

A hierarchical relationship typically represents a containment relationship between software elements. For example, a hierarchical relationship can represent that a variable is contained in a function, that a function is contained in a class, that a class is contained in a file, that the file is contained in a directory, and that a directory is contained in the project, to name just a few examples. Each hierarchical relationship defines a parent element and a child element. Thus, a software element A is a parent element of a software element B when the software element B is contained in the software element A. Likewise, the software element B is a child element of software element A when the software element B is contained in the software element A.

In FIG. 1B, for example, an "int f( )" node 122*b* is a child element of the "f.c" node 120*b* because the definition of the function "f( )" is contained in the file f.c. Similarly, the "y" node 114*b* is a child element of the "int main( )" node 112*b*, which is a child element of the "main.c" node 110*b*. The "int go" node 132*b*, is a child element of the "g.c" node 130*b*. And the "int b( )" node 142*b* is a child element of the "a.c" node 140*b*. For simplicity, the header files of the example project are not illustrated in the example hierarchy graph 100*b*.

The hierarchy graph 100*b* also includes software element nodes representing file system constructs. For example, a "/usr/include" node 104*b* represents the directory "/usr/include," a "/home/jdoe/src" node 106*b* represents the directory "/home/jdoe/src," and a "/home/jdoe/test" node 108*b* represents the directory "/home/jdoe/test." A root node of the hierarchy, project node 102*b*, represents the entire example project.

Thus, the "f.c" node 120*b* is a child element of the "/usr/include" node 104*b* because the source code file f.h is contained in the directory "/usr/include." Similarly, the "main.c" node 110*b* and the "a.h" node 140*b* are child elements of the "/home/jdoe/src" node 106*b* because the source code files main.c and a.h are contained in the directory "/home/jdoe/src." And the "g.h" node 130*b* is a child element of the "/home/jdoe/test" node 108*b* because the source code file g.h is contained in the directory "/home/jdoe/test." The three directory nodes 104*b*, 106*b*, and 108*b*, are child elements of the project node 102*b* because the directories are contained in the project.

Although hierarchical relationships generally represent containment, the definition of the hierarchy is flexible. The definition of the hierarchy can vary according to different programming languages, different build systems, and different user-supplied definitions, which can correspond to business units, geographic locations, security policies, or areas of responsibility. In addition, in some implementations the hierarchy can also be interactively manipulated by a user.

The hierarchical relationships may be collectively referred to or visualized as a hierarchy graph, or for brevity, a hierarchy. When represented as a graph, each node of the hierarchy represents a software element and each software element has a link with one or more other software elements.

The links in the hierarchy can be directed links that represent parent or child relationships. The hierarchy may have one type of link representing a parent relationship or a child relationship, or alternatively, the hierarchy may have two types of links representing parent and child relationships respectively.

Typically, the hierarchy includes a superset of the nodes that are in the raw dependency graph. In other words, the hierarchy includes all software elements represented by the dependency graph in addition to other software elements. For example, the hierarchy 100*b* has nodes that represent all of the software elements represented by the nodes in the raw dependency graph 100*a*. This is because the hierarchy represents containment relationships while the dependency graph represents functional relationships. Thus, even software elements that are not functionally related to any other software elements will still be included in the hierarchy.

The hierarchy can often be represented as a tree with a root node representing the project. However, a tree structure is not necessary. In other words, the hierarchy can be represented by any appropriate acyclic, directed graph that defines parent and child relationships between nodes. Some hierarchies may have multiple root nodes representing multiple projects being analyzed, and some nodes in the hierarchy may be reachable by multiple paths in the hierarchy.

Figure 1C:
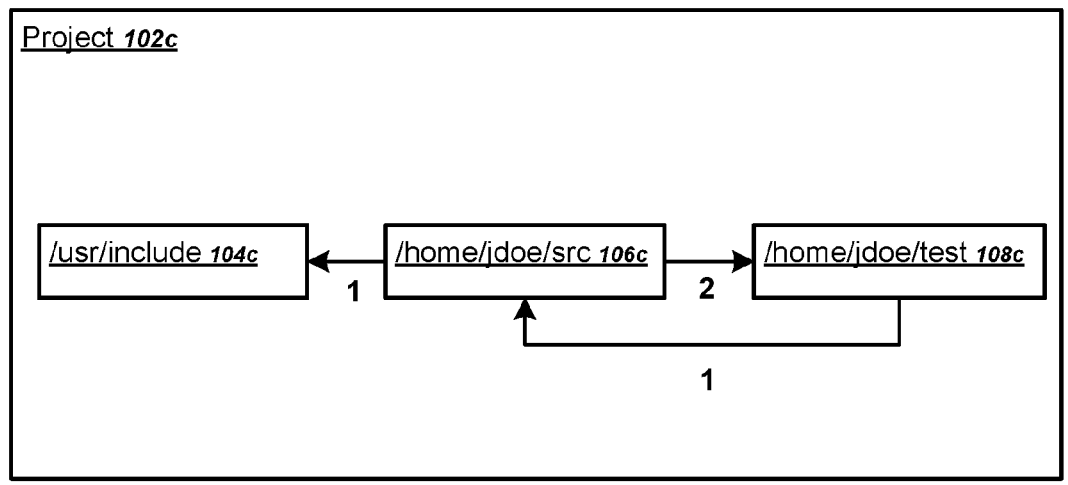
FIG. 1C illustrates an aggregated dependency graph.

FIG. 1C illustrates an aggregated dependency graph 100*c*. From the dependency relationships and the hierarchical relationships, a system can generate aggregated dependency relationships, or for brevity, aggregated dependencies. In general, an aggregated dependency exists between a software element A and a software element B when the software element A, or any descendent in the hierarchy of the software element A, has a dependency relationship with the software element B or with any descendent in hierarchy of the software element B.

In this specification, the set of all dependencies inbound to a node of the hierarchy and inbound to any descendant of the node in the hierarchy will be referred to as a set of aggregated inbound dependencies. In other words, the set of aggregated inbound dependencies is a set union of dependencies inbound to the node and dependencies inbound to any descendant of the node in the hierarchy.

Conversely, the set of all dependencies outbound from a node of the hierarchy and dependencies outbound from any descendant of the node in the hierarchy will be referred to as a set of aggregated outbound dependencies. The set of aggregated outbound dependencies is a set union of dependencies outbound from the node and dependencies outbound from any descendant of the node in the hierarchy.

An aggregated dependency thus represents a non-empty intersection between a set of aggregated inbound dependencies and a set of aggregated outbound dependencies.

Typically, dependency relationships represent a single raw dependency graph for the snapshot. Likewise, hierarchical relationships represent a single hierarchy for the snapshot. In contrast, a vast number of aggregated dependency graphs are possible for a snapshot depending on which dependencies are aggregated.

In FIG. 1C, for example, the project node 102*c* and three directory nodes 104*c*, 106*c*, and 108*c* have been chosen for dependency aggregation. In the resulting aggregated dependency graph, the project node 102*c* is illustrated as containing the three directory nodes 104*c*, 106*c*, and 108*c*.

Each aggregated dependency link between the nodes in the graph 100*c* is displayed with a count that represents a number of dependencies that contributed to the aggregated dependency. For example, the "/home/jdoe/src" node 106*c* has one dependency on the "/usr/include" node 104c because the file main.c in "home/jdoe/src" called one function defined in the file f.c located in the directory "/usr/include." The "/home/jdoe/src" node 106c has two dependencies on "/home/jdoe/test" node 108c because main.c and a.c called two functions that were defined by files in that directory. The link from the "/home/jdoe/src" node 106c to the "/home/jdoe/test" node 108c may be somewhat surprising to a developer or a system architect. This is because it is difficult to see the relationship between those directory from looking at the source code alone or even a raw dependency graph. In addition, it is immediately clear, even at a very high level of inspection, that the project includes a cyclic dependency. In particular, a cyclic dependency exists between the "/home/jdoe/src" node 106c and the "/home/jdoe/test" node 108c. The reason that this cyclic dependency arises may not be clear from browsing the source code itself or complexity of the raw dependency graph 100a. In fact, it arose because functions defined in "home/jdoe/src" call a function defined in "/home/jdoe/test," which itself calls a function defined in "/home/jdoe/src."

The counts associated with the links also provide an intuitive indication of how intertwined the software elements are. For example, it is immediately clear that breaking the cyclic dependency in the graph 100c is probably easier, from a source code development perspective, to remove the link with the count of one rather than the link with the count of two.

Thus, computing aggregated dependencies allows a user to explore the structure of the source code in an intuitive way and to intuitively uncover dependencies and potential problems with the design of the code.

Figure 2:
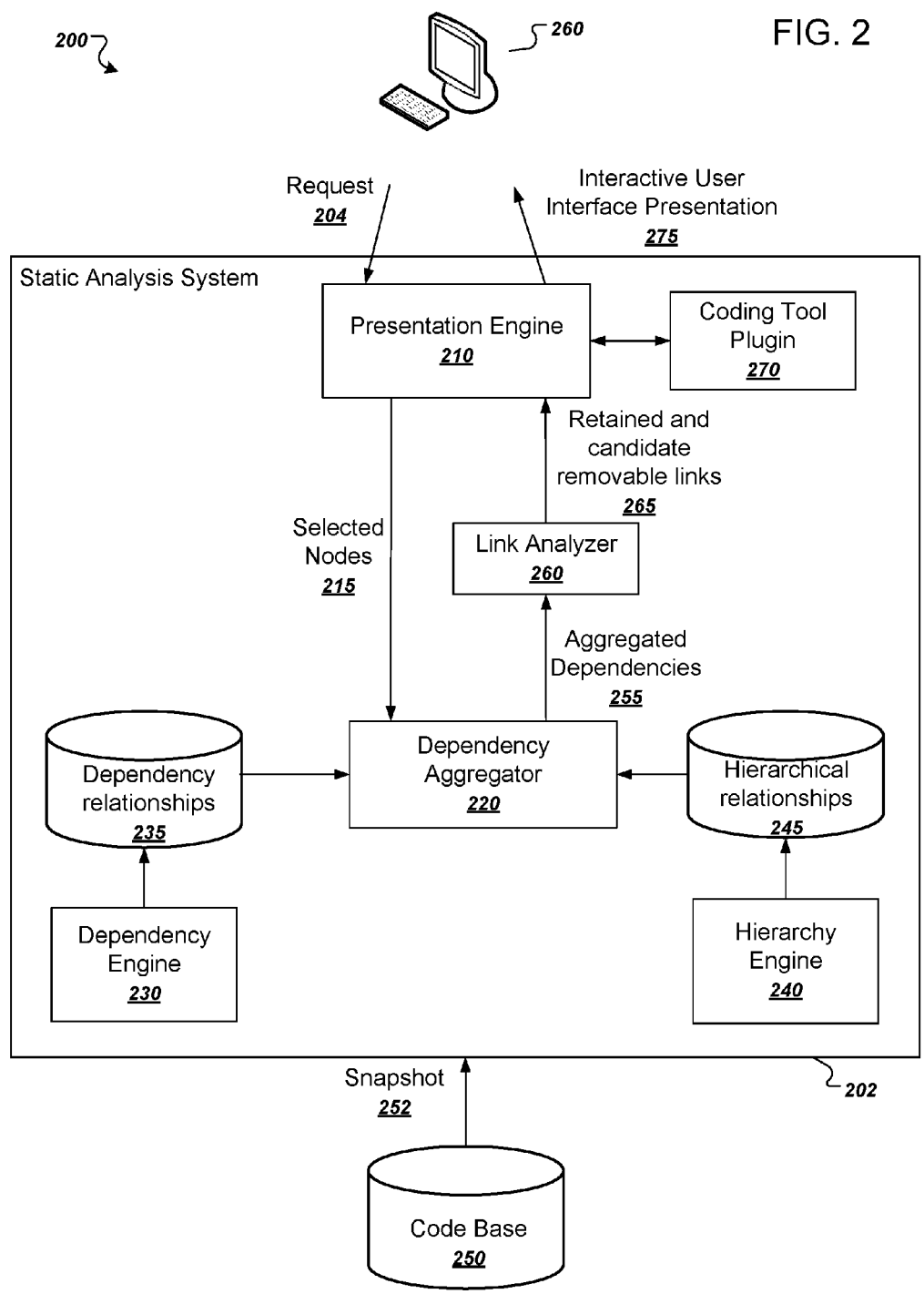
FIG. 2 illustrates an example system.

FIG. 2 illustrates an example system 200. The system 200 includes a user device 260 in communication with a static analysis system 202. The static analysis system 202 includes several functional components, including a presentation engine 210, a dependency aggregator 220, a dependency engine 230, a hierarchy engine 240, a link analyzer 260, and a coding tool plugin 270. Each of these components of the static analysis system 202 can be implemented as computer programs installed on one or more computers in one or more locations that are coupled to each other through a network.

A user of user device 260 can communicate with the static analysis system 202 to browse an interactive user interface presentation of aggregated dependencies between source code elements in the code base 250. Typically only one snapshot 252, or a portion thereof, of the code base 250 is analyzed at a time.

The user device 260 can communicate with the static analysis system 202 over a network, which can be any appropriate communications network, e.g., an intranet or the Internet, or some combination thereof. Alternatively, the static analysis system 202 can be installed in whole or in part on the user device 260.

For example, a user of user device 260 can provide a request 204 that specifies a portion of the snapshot 252 to be analyzed. The request 204 can be generated by an application installed on the user device 260. The application can be a dedicated coding tool or a light-weight client, e.g., a web browser.

Coding tools include any appropriate application that facilitates selection, by a user, of a subset of source code files in the code base 250 that should be analyzed by the system. The static analysis system 202 can use a coding tool plugin 270 to integrate the analysis of source code with a particular coding tool. The coding tool plugin 270 is a software application or module that extends the capabilities of a coding tool by allowing the selection of source code elements and the presentation of analysis results generated by the static analysis system 202 to be integrated into the coding tool. The implementation of the coding tool plugin 270 will depend on the particular coding tool being extended. For simplicity, only one coding tool plugin 270 is shown. However, the system 202 may include multiple coding tool plugins to support a variety of coding tools A presentation engine 210 receives the request 204 and identifies one or more selected nodes 215 that correspond to the request 204. The presentation engine 210 may use the coding tool plugin 270 to identify the selected nodes 215 from a request 204 generated by a coding tool.

For example, the coding tool can be an integrated development environment (IDE). An IDE is an application, or a suite of applications, that facilitates developing source code on a single user device through a graphical user interface. An IDE usually has applications including a source code editor, a compiler, and a debugger. IDEs often also have a file browser as well as object and class browsers. An IDE can use the coding tool plugin 270 to allow the user to select, through the IDE interface, a portion of the code base 250 for analysis. The IDE can then generate the request 204. The coding tool plugin 270 can then automatically identify selected nodes 215 corresponding to software elements for which the aggregated dependencies 255 should be generated. The IDE can also use the coding tool plugin 270 to present the interactive presentation 275 of the aggregated dependencies within the IDE interface.

As another example, the coding tool can be a code review tool. A code review tool is a software application, or suite of software applications, that developers can use to facilitate review of source code files that are the subject of previous or proposed commits or changes to the source code base 250. Thus, a code review tool can use the coding tool plugin 270 to allow a user to select, within an interface of the code review tool, a number of source code files that are part of a proposed commit to the code base 250. The coding tool plugin 270 can then automatically identify selected nodes 215 corresponding to the software elements for which the aggregated dependencies 255 should be generated. The coding tool plugin 270 can then present the interactive presentation 275 of the aggregated dependencies within the code review tool interface.

The dependency aggregator 220 receives the selected nodes 215 and computes aggregated dependencies 255 for the selected nodes 215 using dependency relationships 235 and hierarchical relationships 245.

A dependency engine 230 analyzes code of the snapshot 252 and applies one or more dependency criteria to the code of the snapshot 252 to generate the dependency relationships 235. The dependency engine 230 typically generates the dependency relationships 235 before the request 204 is received.

A hierarchy engine 240 analyzes code of the snapshot 252 as well as the structure of a build system used to build the snapshot to generate the hierarchical relationships 245 using one or more hierarchy criteria. The hierarchy engine 240 also typically generates the hierarchical relationships 245 before the request 204 is received.

Both the dependency criteria used to generate the dependency relationships 235 and the hierarchical criteria used to generate the hierarchical relationships 245 can include language-specific, project-specific, and other user-defined criteria.

Unlike the dependency relationships 235 and the hierarchical relationships 245, the aggregated dependencies 255 are typically computed in real-time. This is due to the vast number of possible software elements and the vast number of possible aggregated dependencies between those software elements making it infeasible in time and storage space to generate every possible aggregated dependency before the request is received. In other words, the dependency aggregator 220 computes the aggregated dependencies 255 after the system 202 receives the request 204 and after receiving the identification of the selected nodes 215.

The dependency aggregator 220 provides the aggregated dependencies 255 to a link analyzer 260. The link analyzer 260 processes the aggregated dependencies 255 to identify candidate removable links. Candidate removable links are suggestions for how the project can be improved. Candidate removable links can be identified due to links violating one or more explicit or implicit rules for how aggregated dependencies among software elements in the project should be arranged. In reality, a candidate removable link cannot simply be removed without incurring consequences to the project. For example, developers will typically need to modify one or more source code files in order to remove a link from the aggregated dependency graph.

One example of an implicit rule that is almost universal in all software development is that cyclic dependencies are undesirable. Thus, the system can identify cycles in the graph and suggest, by providing candidate removable links, ways that the cycles can be removed from the graph with minimal impact to the project. The link analyzer 260 thus classifies links in the aggregated dependencies as retained links or candidate removable links. Classifying links as retained links or candidate removable links is described in more detail below with reference to FIG. 5. The link analyzer then provides the retained and candidate removable links 265 to the presentation engine 210.

The presentation engine 210 generates an interactive user interface presentation 275 having the retained and candidate removable links 265. The interactive user interface presentation 275 displays aggregated dependencies 255 for the portion of the snapshot 252 identified by the request 204. The presentation engine 210 then provides the interactive user interface presentation 275 back to the user device 260 for presentation to the user, possible by using the coding tool plugin 270. Example interactive user interface presentations that make use of retained and candidate removable links are described in more detail below with reference to FIGS. 6A-6F.

Figure 3:
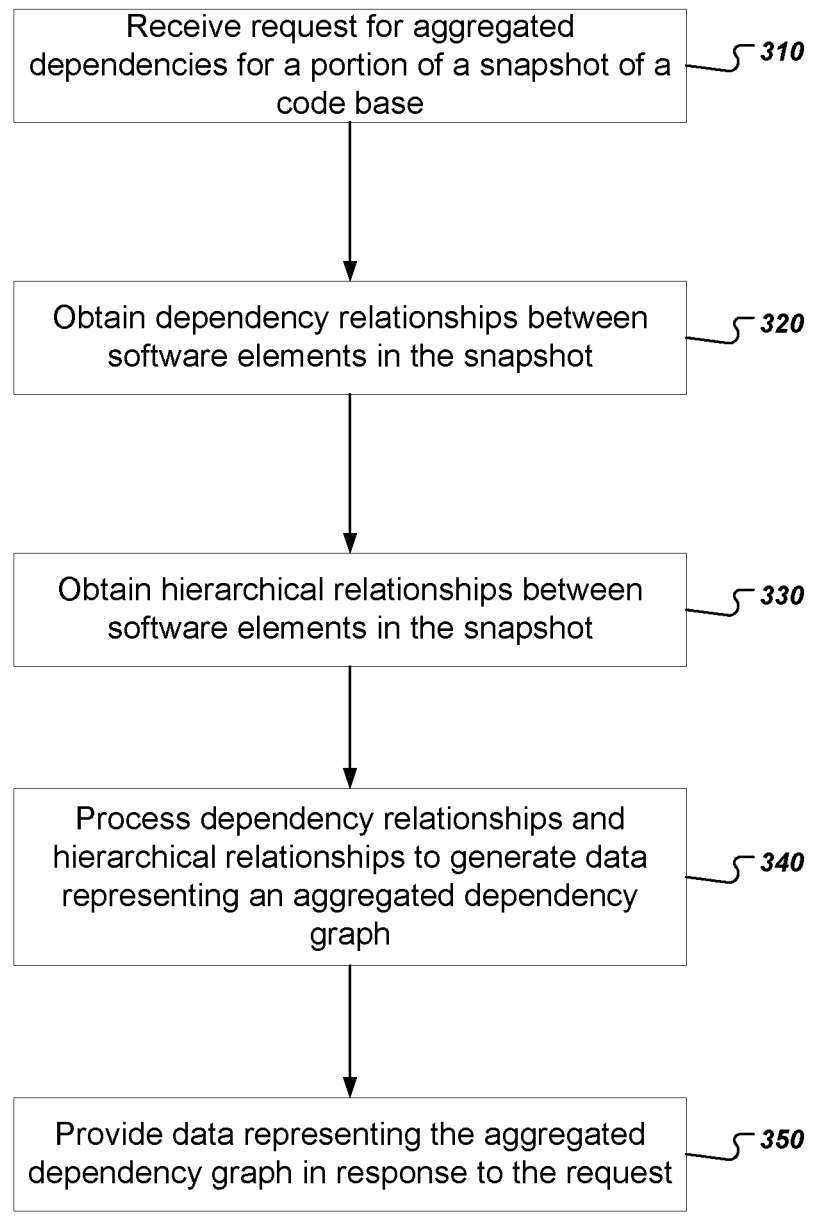
FIG. 3 is a flow chart of an example process for generating aggregated dependencies.

FIG. 3 is a flow chart of an example process for generating aggregated dependencies. A system can use dependency relationships and hierarchical relationships to generate aggregated dependencies for a selected portion of a snapshot. The process will be described as being performed by an appropriately programmed system of one or more computers, e.g., the static analysis system 202 of FIG. 2.

The system receives a request for aggregated dependencies for a portion of a snapshot of a code base (310). The request can for example specify one or more software elements of the snapshot for which aggregated dependencies should be generated.

For example, the user can view an interactive presentation of an aggregated dependency graph. Example interactive presentations of the aggregated dependency graph are described in more detail below with reference to FIGS. 6A-6F.

The system obtains dependency relationships between software elements in the snapshot of the code base (320). The system can represent each distinct software element in the snapshot with a unique ID. The system can also maintain metadata for each distinct software element in a metadata table or other form of data storage. The metadata for a software element can include location information, for example, a location in a file of the software element, a location of the file in a file system, or both.

The system can represent a dependency relationship with a pair of software element IDs. A first software element of the pair, which is referred to as the source element, represents a software element that depends on a second software element of the pair, which is referred to as the target element. Because of the directional nature of the dependency relationships, two software elements can depend on each other, in which case two dependency relationships would exist between the two software elements.

The system can store the dependency relationships as a two-column table. The first column represents the software element ID of the source element, and the second column represents the software element ID of the target element. The system can then use the row number of the table to uniquely identify each dependency relationship.

The system obtains hierarchical relationships between software elements in the snapshot of the code base (330). The system can represent a hierarchical relationship with a pair of software element IDs. A first software element of the pair, which can be referred to as the parent element, represents a software element that is a parent in a hierarchy of a second software element of the pair, which can be referred to as the child element.

The system can likewise store the hierarchical relationships in a two-column table. The first column represents the software element ID of the parent element, and the second column represents the software element ID of the child element. The system can then use the row number of table to uniquely identify each hierarchical relationship.

The system can define a number of different hierarchical relationships in order to generate the hierarchy graph. For example, instead of using files and directories as the nodes of the hierarchy, the system could use namespaces to define the hierarchy. Then, if different classes were defined in different files but were in the same namespace, nodes representing the classes would share a parent in the hierarchy.

The system processes the dependency relationships and the hierarchical relationships to generate data representing an aggregated dependency graph (340). For each pair of selected nodes representing software elements, the system can determine whether a first software element of the pair or any of its descendants depends on a second software element of the pair or any of its descendants. If so, the system generates a link representing the aggregated dependency between the nodes representing the first and second software elements.

Computing the aggregated dependencies from the dependency relationships and the hierarchical relationships will be described in more detail below with reference to FIG. 4.

The system provides the data representing the aggregated dependency graph in response to the request (350). For example, the system can generate a presentation that illustrates the aggregated dependency graph. The system can also generate any appropriate representation of the graph for consumption by another software tool.

Figure 4:
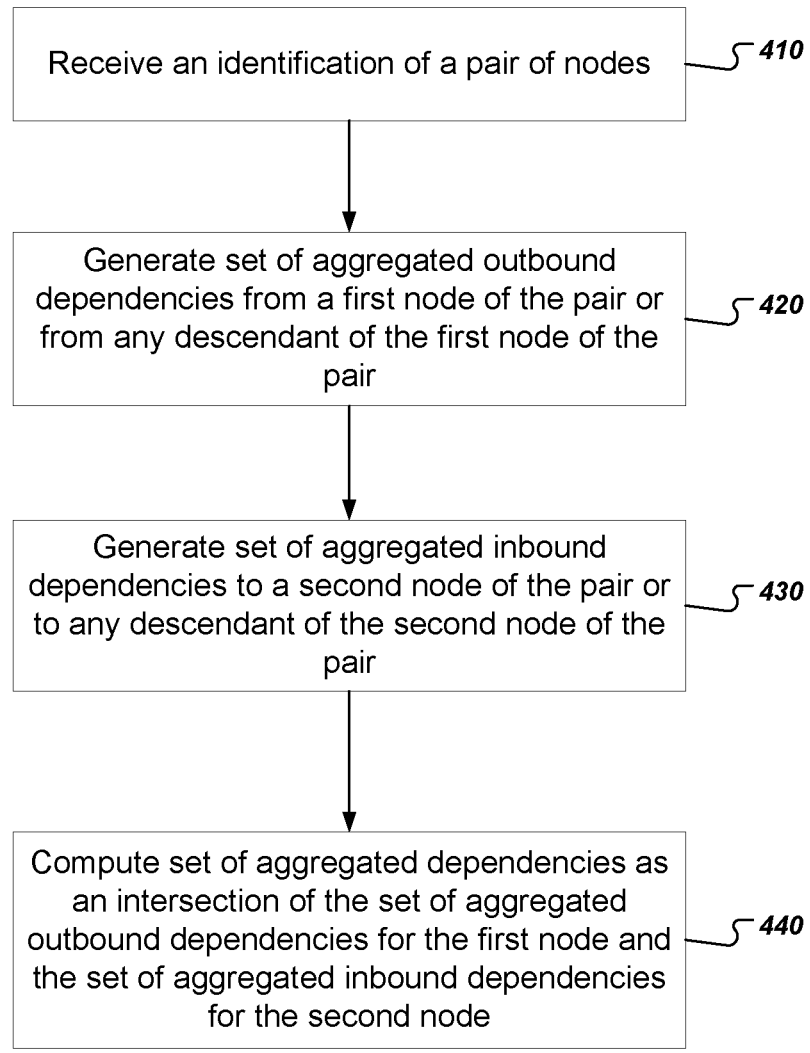
FIG. 4 is a flow chart of an example process for computing aggregated dependencies between a pair of nodes.

FIG. 4 is a flow chart of an example process for computing aggregated dependencies between a pair of nodes in the hierarchy. The process will be described as being performed by an appropriately programmed system of one or more computers, e.g., the dependency aggregator 220 of FIG. 1.

The system receives an identification of a pair of nodes (410). Each node represents a software element in the hierarchy. For example, a user can provide a selection of one or more nodes of a portion of an aggregated dependency graph.

The system generates a set of aggregated outbound dependencies, which is a set union of dependencies outbound from a first node of the pair and dependencies outbound from any descendants of the first node in the hierarchy (420). As described above, each dependency relationship in the snapshot has a unique ID. Thus, the system can generate a set of aggregated outbound dependencies as a set of all dependency IDs in which the first node or any descendant of the first node in the hierarchy occurs as a source element.

The system generates a set of aggregated inbound dependencies, which is a set union of dependencies inbound to a second node of the pair and dependencies inbound to any descendants of the second node in the hierarchy (430). Similarly, the system the system can generate a set of aggregated inbound dependencies as a set of dependency IDs in which the second node or any descendant of the second node in the hierarchy occurs as a target element.

The system computes a set of aggregated dependencies as an intersection of the aggregated outbound dependencies for the first node and the aggregated inbound dependencies for the second node (440). If the intersection is not empty, the system generates an aggregated dependency link from the first node to the second node. The system can repeat the process in reverse for determining whether an aggregated dependency link exists from the second node to the first node.

Techniques for representing the sets of aggregated inbound dependencies and aggregated outbound dependencies and for quickly computing the intersection of the sets using these representations are described in more detail below.

Figure 5:
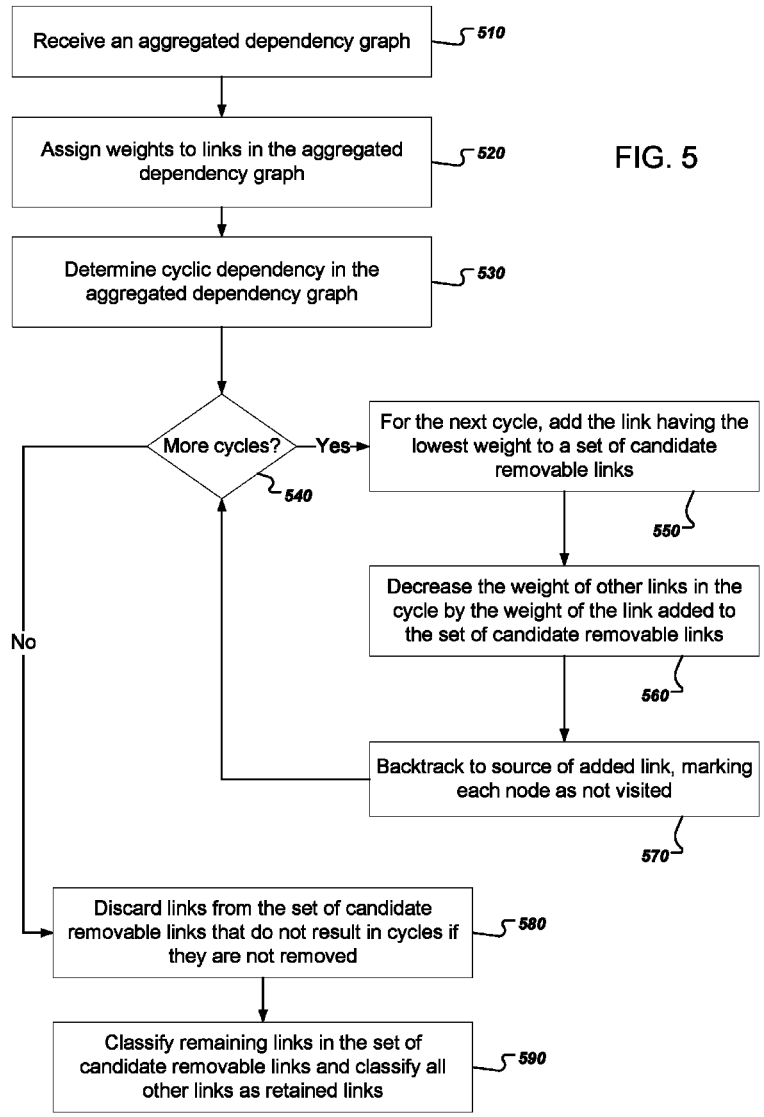
FIG. 5 is a flow chart of an example process for identifying candidate removable links.

FIG. 5 is a flow chart of an example process for identifying candidate removable links due to cycles. The system can analyze links in an aggregated dependency graph to identify cyclic dependencies. Cyclic dependencies are usually a problem for software projects because they represent a breakdown in modularity and thus introduce problems in maintainability. For example, if a file A depends on a file B, and the file B depends on a file C, and the file C depends on the file A, a cyclic dependency exists. Therefore, any changes made to file A may also require changes to file B and also file C to avoid breaking the build. The example process can automatically suggest, e.g., to a software architect, how to address such cyclic dependencies in a code base. The process will be described as being performed by an appropriately programmed system of one or more computers, e.g., the link analyzer 120 of FIG. 1.

The system receives an aggregated dependency graph (510). As described above, the system can compute the aggregated dependency graph from dependency relationships and hierarchical relationships. The system can compute the aggregated dependency graph in response to a user selection of one or more nodes representing software elements of a code base.

The system assigns weights to links in the aggregated dependency graph (520). Between a first software element and a second software element, the weight of a link represents how significantly the first software element depends on the second software element. The significance of the dependency increases as the number of descendants of the first software element that depend on the second software element or any descendants of the second software element increases.

In some implementations, the system computes a count of dependencies from the first software element and any descendants of the first software element to the second software element or any descendants of the second software element. The system then uses the count to compute the weight for the link between the first software element and the second software element. In some cases, the weight is the count itself.

The system can also use a variety of other factors when computing the weight. For example, the system can consider the type of dependency, as some types of dependencies are easier to remove than others. The system can also consider a measure of how tangled a target of the dependency is with siblings of the target. For example, if A depends on a constant defined in B, and the constant in B is not used at all, then the constant can be moved to A with little difficulty. On the other hand, if the constant is used throughout B, removing the dependency is harder and the system can adjust the weight accordingly. The system can also consider other factors, e.g., cyclomatic complexity of a target of the dependency.

One benefit of using the count of dependencies as the weight is that it provides a user with a very useful and intuitive sense for how hard the link would be to remove. When the weight represents a count of dependencies, the weight intuitively indicates how many software elements need to be changed in order to remove the link.

The system can also compute the weight based on a distance between the first software element and the second software element. The distance can represent how intertwined the two software elements are in terms of their occurrences in the code base. For example, if the first software element and the second software element co-occur infrequently, the distance is likely to be large. But if the first software element and the second software element co-occur frequently, the distance is likely to be small. In this context, distance is inversely proportional to weight because a large distance represents a smaller significance of the dependency between the software elements. Thus, a larger distance will result in a smaller weight.

The system need not compute weights of the links as a separate and subsequent process to that of generating the aggregated dependency graph. Rather, the system can compute the weights of the links as the aggregated dependency graph is being constructed.

In some implementations, the system provides a user interface that allows a user to mark some links as non-candidates for removal. This can be useful, for example, when a portion of the code base is not controlled by the user. Thus, in response to the user designation of links as non-candidates for removal, the system can assign a very high weight or a special value that indicates that the link is not to be classified as removable under any circumstances.

The system determines cyclic dependencies in the aggregated dependency graph (530). A software element A depends transitively on a software element B if a path in the aggregated dependency graph exists from a node representing software element A to a node representing the software element B. A cyclic dependency occurs whenever a particular node transitively depends on itself.

The system can determine cyclic dependencies using any appropriate search procedure. For example, the system can perform a recursive depth-first search, marking nodes as "visited" as they are processed. When the system processes a node that has already been marked as visited, the system can determine that a cyclic dependency exists. When the system determines that a cyclic dependency exists, the system processes links along the cycle to identify a candidate link for removal.

Thus, if there are more cycles to be processed (540), the system processes the next cycle by adding the link along the cycle having the lowest weight to a set of candidate removable links (branch to 550). The set of candidate removable links identifies candidate links that the system can suggest to a user as ways to get rid of cyclic dependencies in the code base.

The system decreases the weight of other links in the cycle by the weight of the link that was added to the set of candidate removable links (560). Decreasing the weight of other links in the cycle can reveal when a heavy link that is part of multiple cycles is more preferable to remove than multiple light links on single cycles. In other words, as each cycle of the heavy link is processed, the heavy link becomes effectively cheaper and cheaper to remove.

The system backtracks to the source of the added link, marking each node as not visited (570). The system has already determined a candidate link for removing the currently detected cycle. However, the system can mark nodes on the cycle as "not visited" so that they will be considered appropriately if they are part of other cycles in the graph.

The system can then continue searching the graph for additional cycles, processing each newly found cycle.

If there are no more cycles to be processed (540), the system discards links from the set of candidate removable links that do not result in cycles if they remain in the graph (branch to 580). Because each cycle is processed separately, it is possible that the set of candidate removable links includes more links than must be removed to remove all cycles in the aggregated dependency graph. For example, after adding a first link to the set of candidate removable links that would break cycle C1, the system may then add a second link to the set of candidate removable links that would break cycle C2 and which would also happen to break cycle C1 as well. Thus, the first link and the second link need not both be in the set of removable links. Rather, the first link can be discarded from the set of removable links so that it will be reclassified as a retained link.

Because the weight of the links approximates the amount of work that would be required to remove the link, the system can discard links in the set of candidate removable links in order of decreasing weight. In other words, the system can iterate over links in the set of candidate removable links from heaviest to lightest, discarding each link from the set that would not reintroduce a cycle, assuming that all other links in the set of candidate removable links were indeed removed.

In some implementations, the system provides a user interface that allows the user to specify an order in which the candidate removable links should be discarded from the set. This can be useful, for example, when parts of the code base represent well-tested or legacy software that the user would rather not modify significantly. Thus, the user can move links from parts of the code base that the user does not want to modify to the top of the list, and the system will first attempt to remove those links from the set of candidate removable links.

The system classifies remaining links in the set of candidate removable links and classifies all other links as retained links (590). In other words, the system classifies links that are not candidates for removal as retained links.

The system can then suggest links that are classified as candidate removable links to the user.

To do so, the system can then generate various user-interface presentations that illustrate the aggregated dependency graph arranged according to retained and candidate removable links.

FIGS. 6A-6L illustrate example user interface presentations of aggregated dependency graphs. Each example presentation illustrates a different layout for presenting an aggregated dependency graph according to links classified as candidate removable links and links classified as retained links.

The examples illustrate the structure of a simple example software project "even-or-odd" written in C and which has the following source code files.

First, the project includes a main file, main.c, which has the following source code:

```
#include <stdio.h>
#include "even.h"
int main( ) {
    int val;
    printf("Enter a number: ");
    scanf("%d", &val);
    if (even(val))
        printf("%d is even\n", val);
    else
        printf("%d is odd\n", val);
    return 0;
}
```

The "even" function is declared in even.h, which has the following source code:
int even(int);
The "even" function is defined in even.c, which has the following source code:

```
#include <stdio.h>
#include "odd.h"
int even(int x) {
    if (x == 0)
        return 1;
    if (x > 0)
        return odd(x-1);
    else
        return odd(x+1);
}
```

The function "even" depends on an "odd" function declared in odd.h, which has the following source code:
int odd(int);
The function "odd' is defined in odd.c, which has the following source code:

```
#include <stdio.h>
#include "even.h"
int odd(int x) {
    if (x == 0)
        return 0;
    return even(x > 0 ? x-1 : x+1);
}
```

As shown in the example source code, the function "odd" has one dependency on the function "even" due to calling the function "even" one time, while the function "even" has two dependencies on the function "odd" due to calling the function "odd" twice. Also, because the two functions depend on each other, the aggregated dependency graph will include a cycle. After processing the source code of this project and generating aggregated dependencies, the system can generate a variety of layouts to present this information.

Figure 6A:
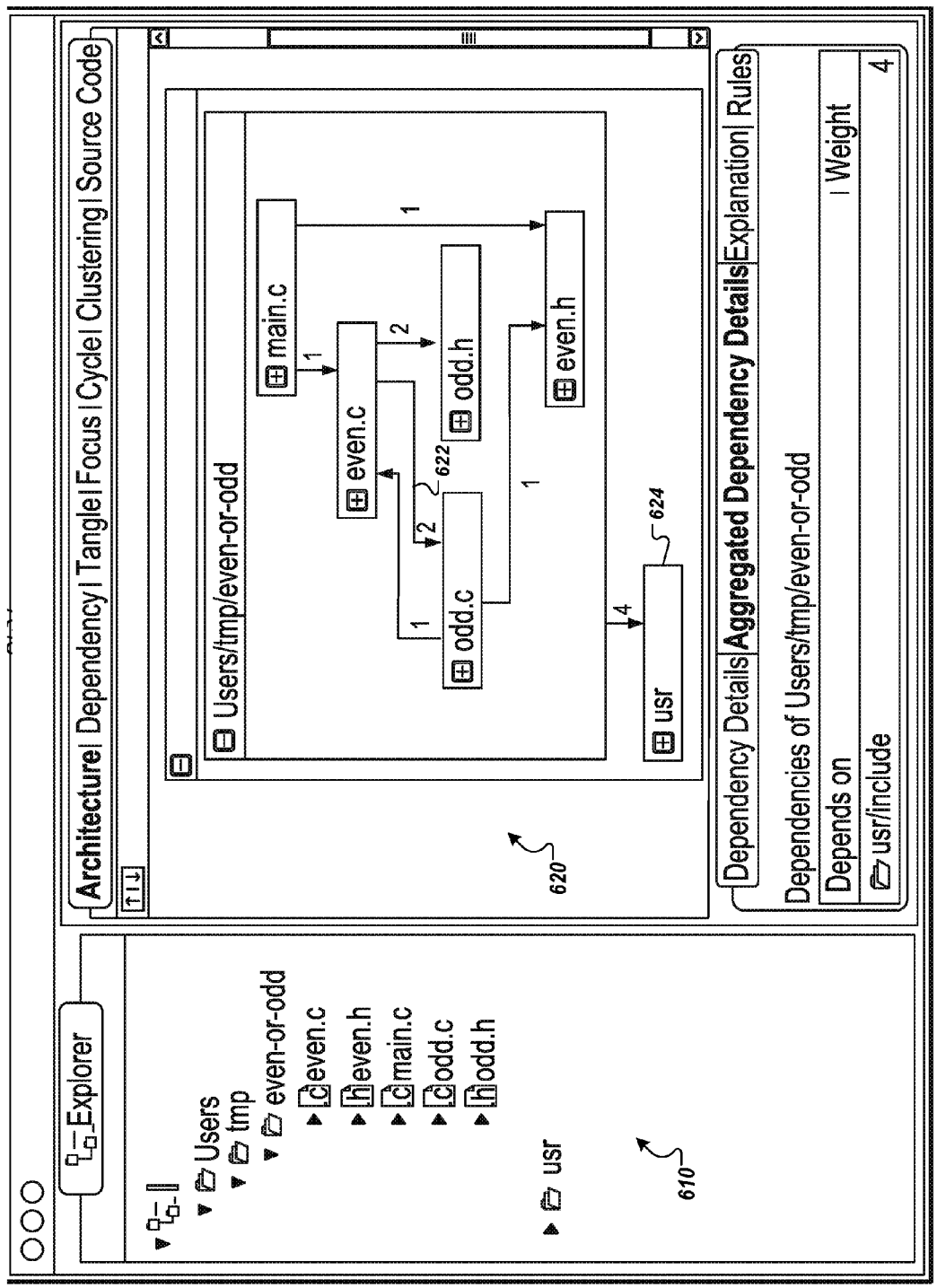

FIG. 6A illustrates a default layout. The default layout illustrates nodes that represent software elements and links that represent aggregated dependencies between the software elements. Each node may have multiple descendant nodes according to the hierarchy graph.

The example presentation includes a hierarchy explorer 610 that allows a user to interactively browse the hierarchy graph. The example presentation also includes an aggregated dependency graph pane 620 that shows nodes from the hierarchy and links representing the aggregated dependencies between them.

Each of the links is presented with an associated count representing the number of dependencies between the corresponding software elements. The link 622, for example, represents that the file even.c has two dependencies on the file odd.c.

In the default layout, all nodes of the hierarchy are selected for presentation. However, the system may cut off some nodes at a particular level of detail in order to comply with space limitations of the aggregated dependency graph pane 620. For example, the illustrated aggregated dependency graph also includes a "usr" node 624 that contains only system software code, as opposed to user code.

A user can also select or filter dependencies by type. In other words, the user can choose different types of dependencies to be shown or hidden from the graph.

Figure 6B:
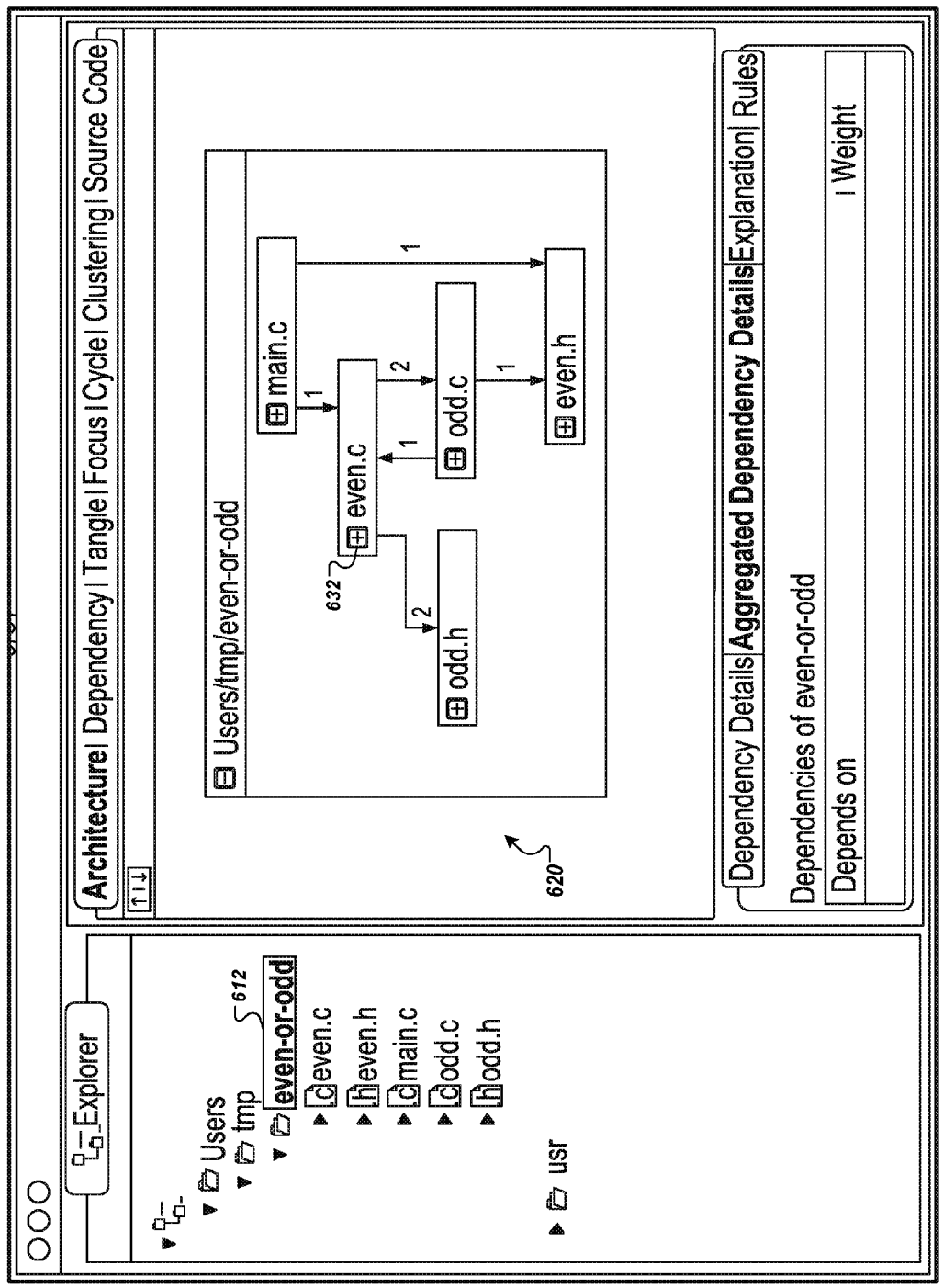

FIG. 6B illustrates selection of a directory node of the hierarchy. A user can select or filter one or more nodes in the presentation to view additional nodes and their aggregated dependencies. For example, in FIG. 6B a user has selected the directory node 612 of the hierarchy corresponding to the "even-or-odd" directory. In this view, if both a child and a parent node are selected, the parent node will be displayed, with the children nested inside it.

In response to the selection, the system updates the presentation of the aggregated dependency graph to show only a graph having the selected nodes of the hierarchy. In this example, the aggregated dependency graph pane 620 no longer shows a node representing the "usr" system software node.

A user can drill down further into the presented nodes by using an expansion icon presented with each node in the aggregated dependency graph pane 620, e.g., expansion icon 632 of the even.c node.

Figure 6C:
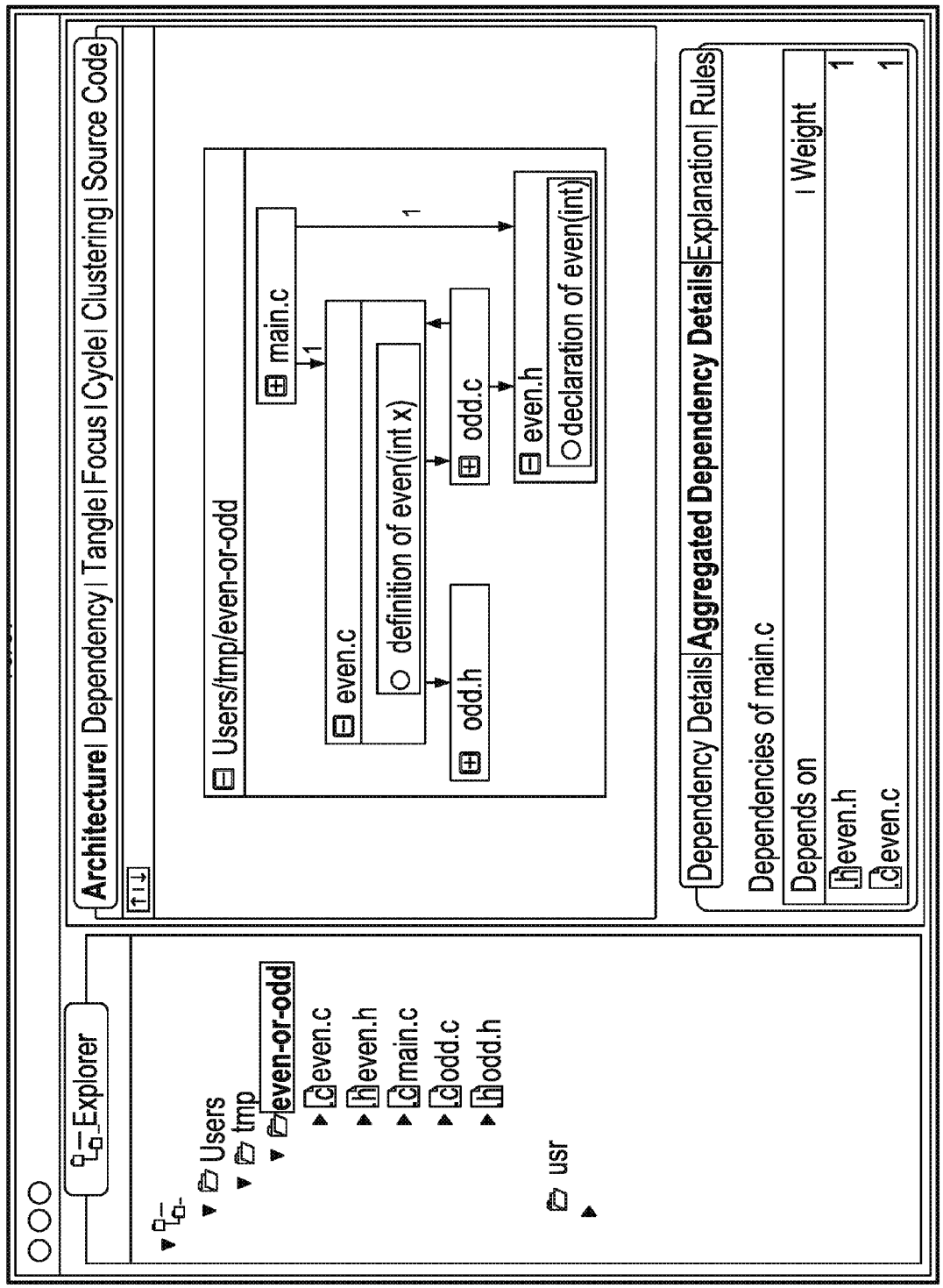

FIG. 6C illustrates expanding a file node of the hierarchy. In FIG. 6C, a user has selected the expansion icons for even.c and even.h. In response, the system displays software elements within the expanded files. For example, a user can choose to expand a node representing a particular software element, which can cause the system to display the immediate children nodes of the selected node according to the hierarchy graph. Or the user can choose to collapse a node to hide its immediate children. Either of these user actions triggers the system to recompute the aggregated dependencies for the nodes to be displayed.

Figure 6D:
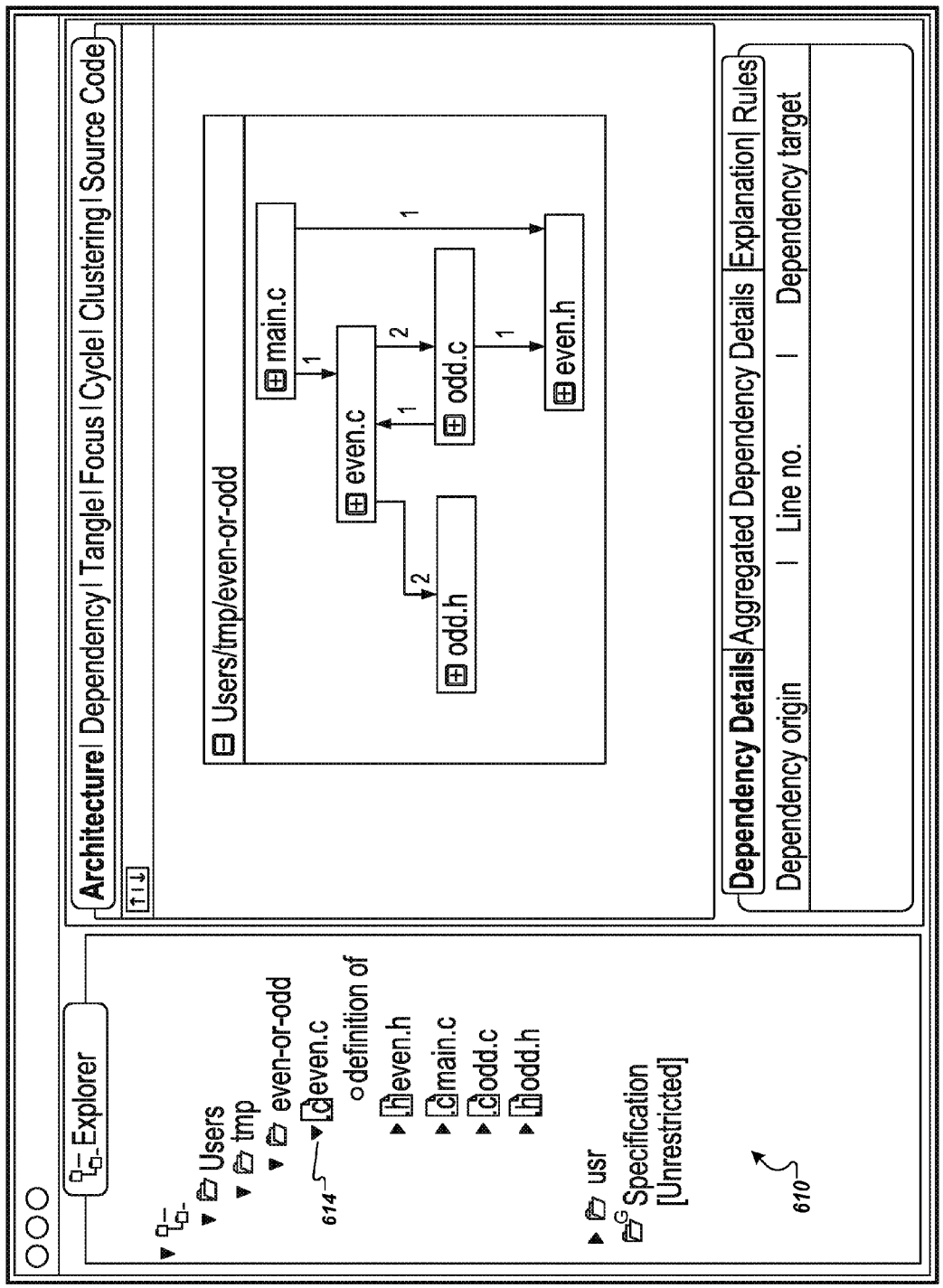

FIG. 6D illustrates expanding a file node in the hierarchy explorer 610. In FIG. 6D, a user has selected an expansion icon 614 presented within the hierarchy explorer 610. In response, the system displays software elements contained within the corresponding file as subnodes in the hierarchy explorer 610.

Figure 6E:
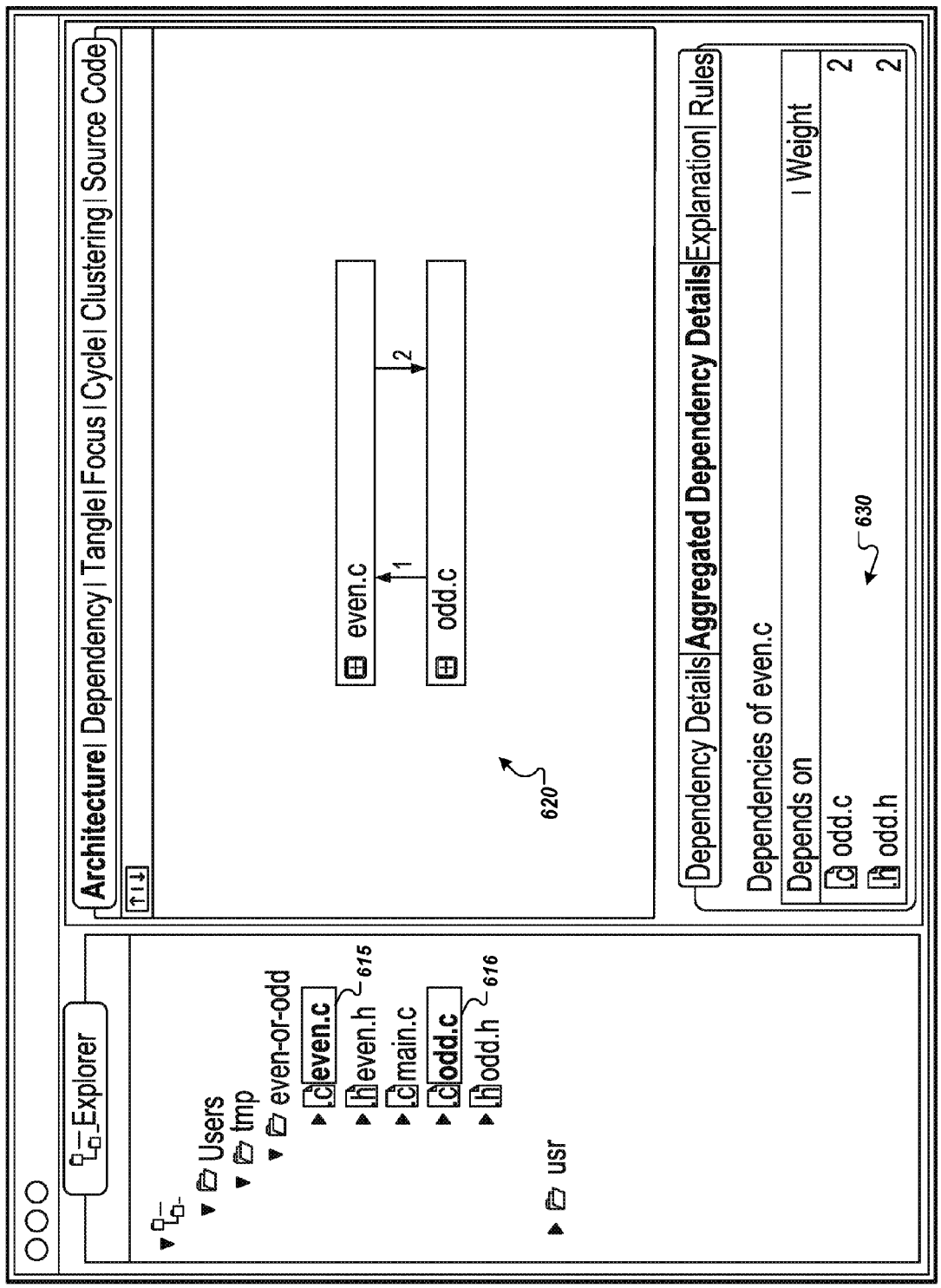

FIG. 6E illustrates selection of multiple file nodes of the hierarchy. In FIG. 6E, a user has selected only a subset of nodes of the project, the even.c node 615 and the odd.c node 616. In response, the system updates the aggregated dependency graph pane 620 to show an aggregated dependency graph with dependencies only between the selected nodes. In this example, the system shows the one dependency of odd.c on even.c and the two dependencies of even.c on odd.c.

Figure 6F:
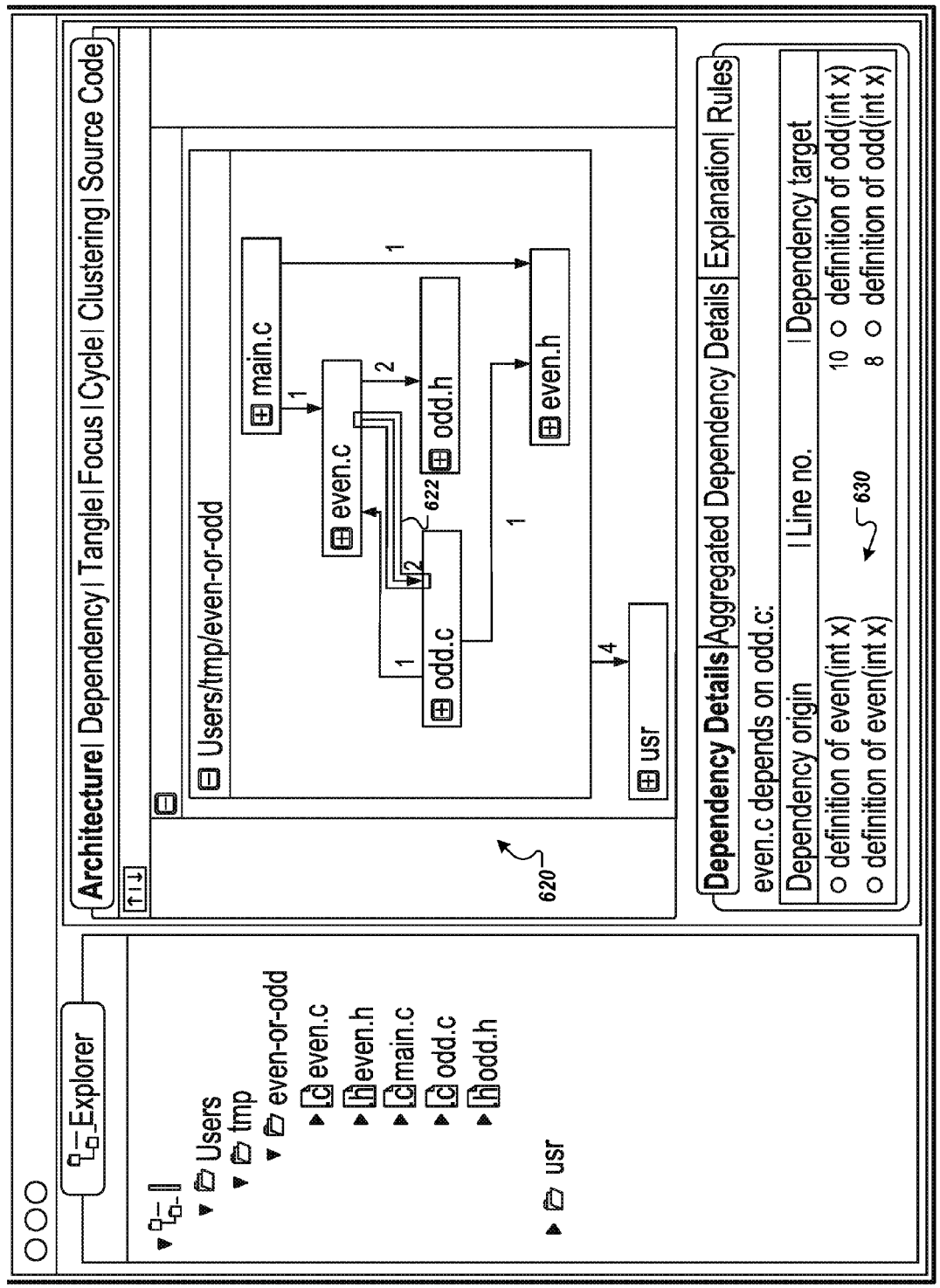

FIG. 6F illustrates selection of a particular dependency. In FIG. 6F, a user has selected a particular dependency 622 in the aggregated dependency graph pane 620. In response, the system displays more details about the corresponding dependencies in a dependency pane 630.

FIG. 6G illustrates a source code file view in response to a dependency selection. In FIG. 6G, a user has selected a particular dependency in the dependency pane 630. In response, the system displays the source code in a source code pane 640 that replaces the aggregated dependency graph pane 620.

The system can highlight the exact source code causing the dependency selected by the user. For example, the source code pane highlights the call to the function "odd" 642, which is the code that causes the dependency selected by the user.

Figure 6H:
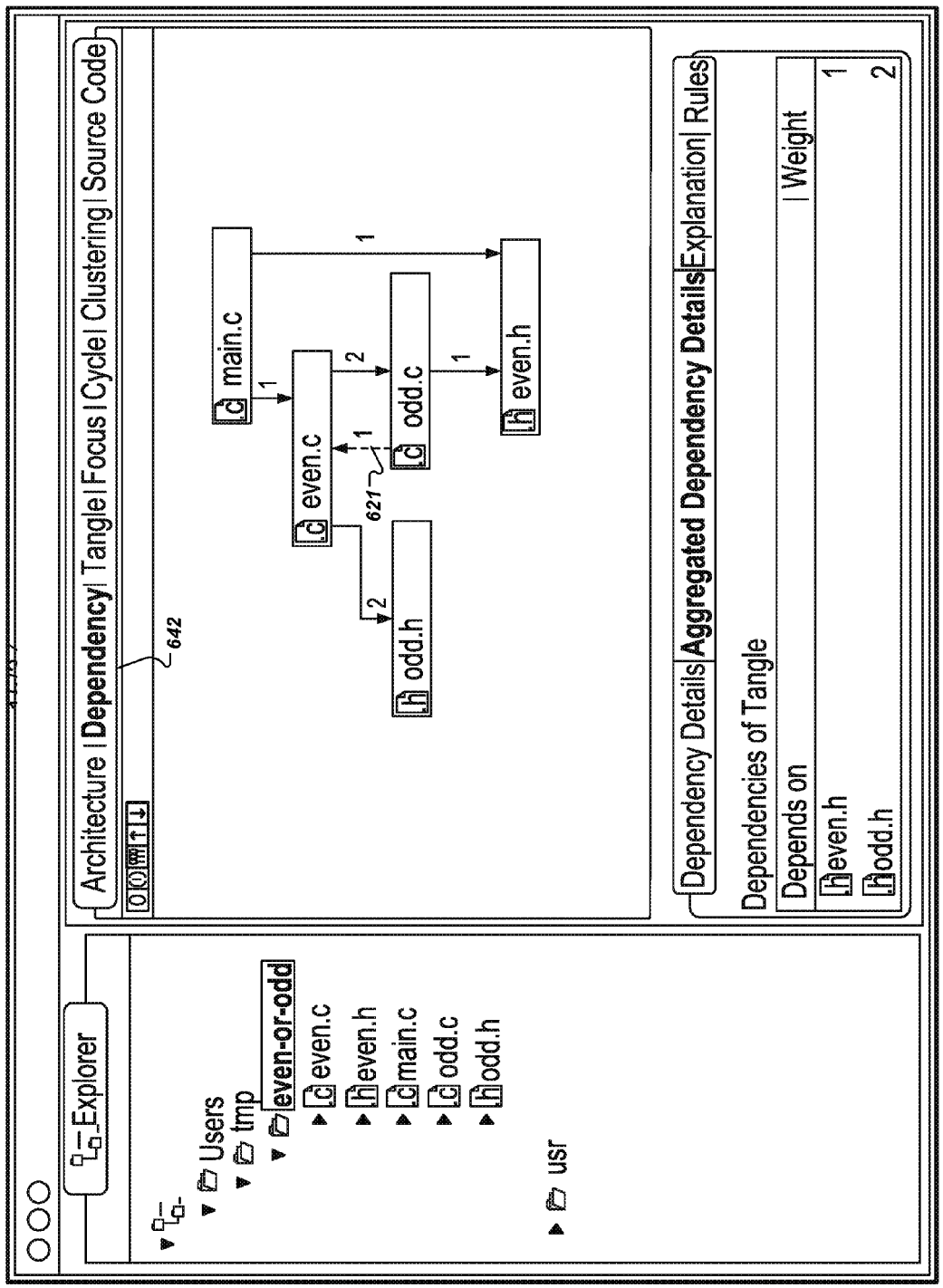

FIG. 6H illustrates candidate removable links. In FIG. 6H, a user has selected a new view for the aggregated dependency graph by selecting the user interface element 642 for the "Dependency" view. In this view, if both a child and a parent are selected, only the children are displayed.

The system then determines one or more candidate removable links for the selected nodes of the hierarchy. For example, the link 621 is a candidate removable link, which the system visually distinguishes from other links by presenting the candidate removable link as a dashed line.

The system can visually distinguish the removable links from the retained links in any appropriate way. For example, the system can present the removable links in a different color, a different style, or a different line thickness, to name just a few examples.

A user can also select or filter the cyclic dependencies by type. Cyclic dependencies in the code base may be problematic for some types of dependencies but not others. For example, include-type dependencies are an example dependency type for which cycles may not be a problem. Thus, the user can select a particular type of dependency to show or filter another particular type of dependency for which cycles are not a problem.

The system can also present the weight of each link near the link itself. The presentation of the weight provides users with an intuitive indication of how much work on the code base would be required to remove each link. For example, the link 621 has a weight of 1, whereas the other link in the cycle has a weight of 2. Thus, removing link 621 will probably require less effort than removing the other link in the cycle.

Figure 6I:
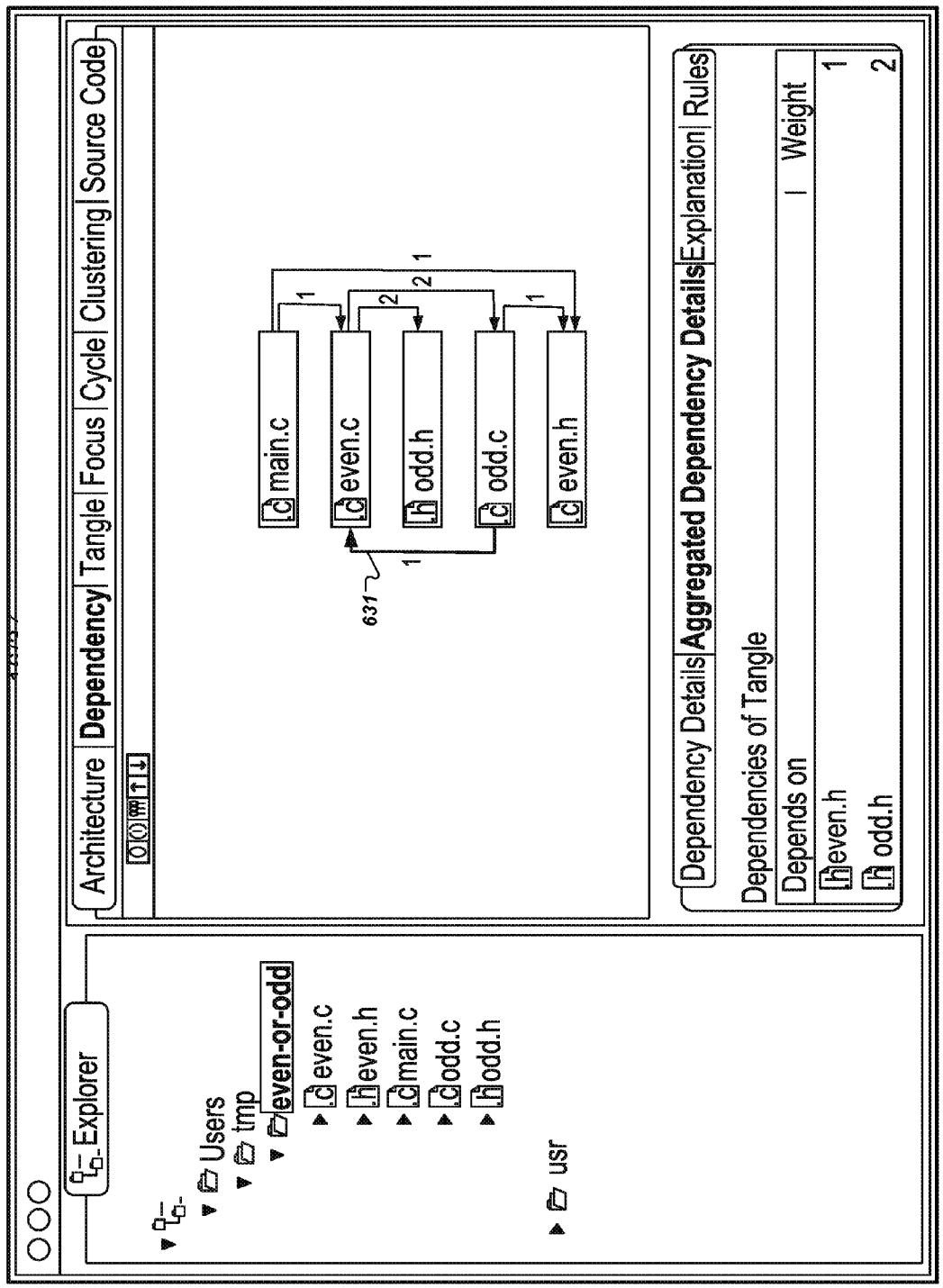

FIG. 6I illustrates a serial layout. In the serial layout, all software element nodes of the aggregated dependency graph are arranged in a column such that all retained links point downwards and all candidate removable links point upwards. In this example, the link 631 is the only candidate removable link, and thus it points upwards while all other links point downwards. This layout reveals an ordered structure of the software elements and highlights the cyclic and acyclic aspects of the code base.

Figure 6J:
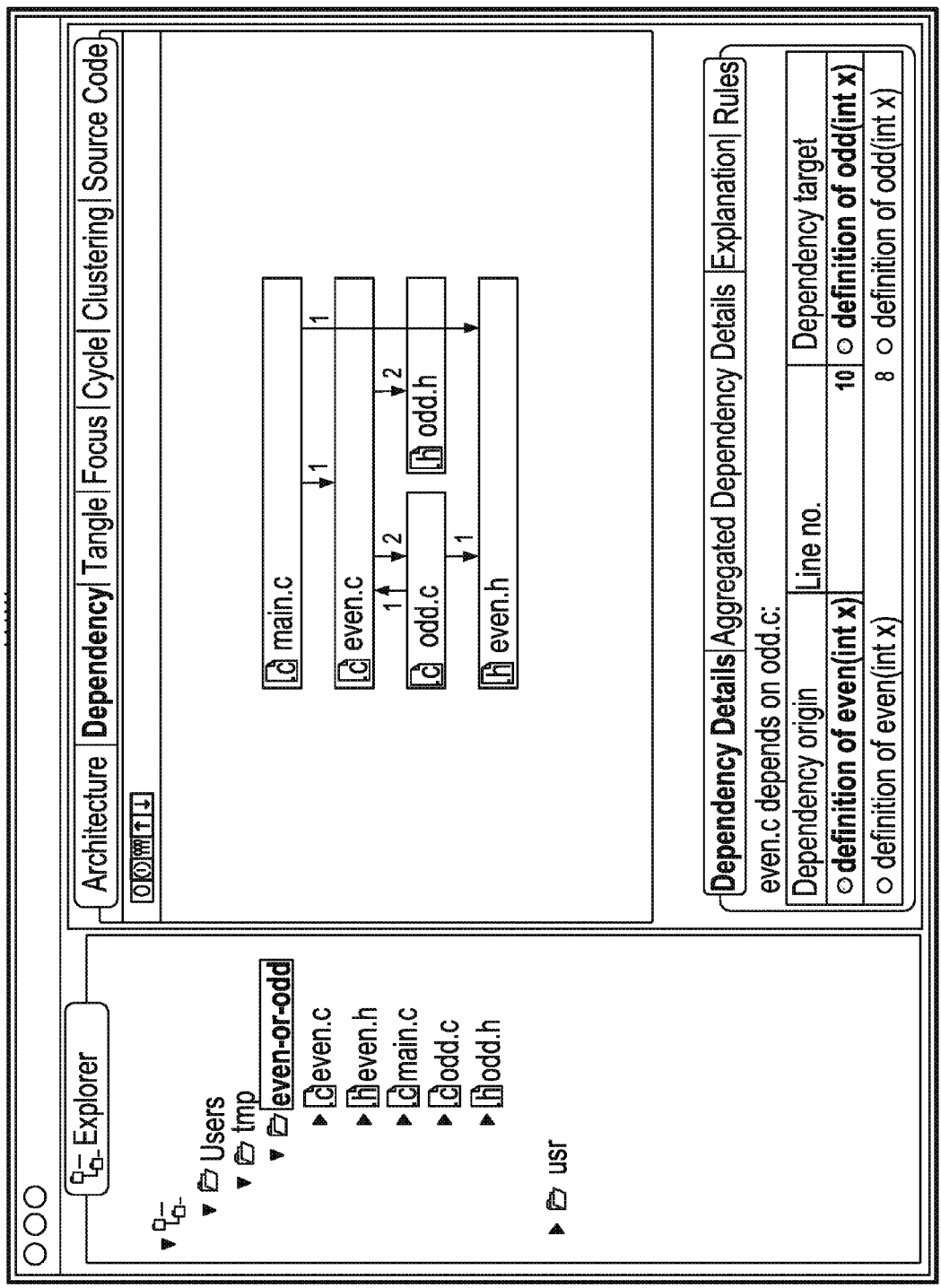

FIG. 6J illustrates a layered layout. In this layout, the system displays all software elements in horizontal layers such that (1) there are no dependencies between software elements in a layer, and (2) all retained links point downwards to other layers, and (3) all candidate removable links point upwards to other layers. This layout reveals a layering and an ordering structure among the software elements. This layout is also generally intuitively understandable for a higher number of software elements and links than the serial layout.

The system can also present a clustered layout that is based on the layered layout. In the clustered layout, the system presents each layer as a proposed cluster and presents links representing aggregated dependencies between the proposed clusters instead of between the individual software elements. The system can generate the clusters as a suggestion to a user for how the software elements should be packaged according to the aggregated dependencies.

Figure 6K:
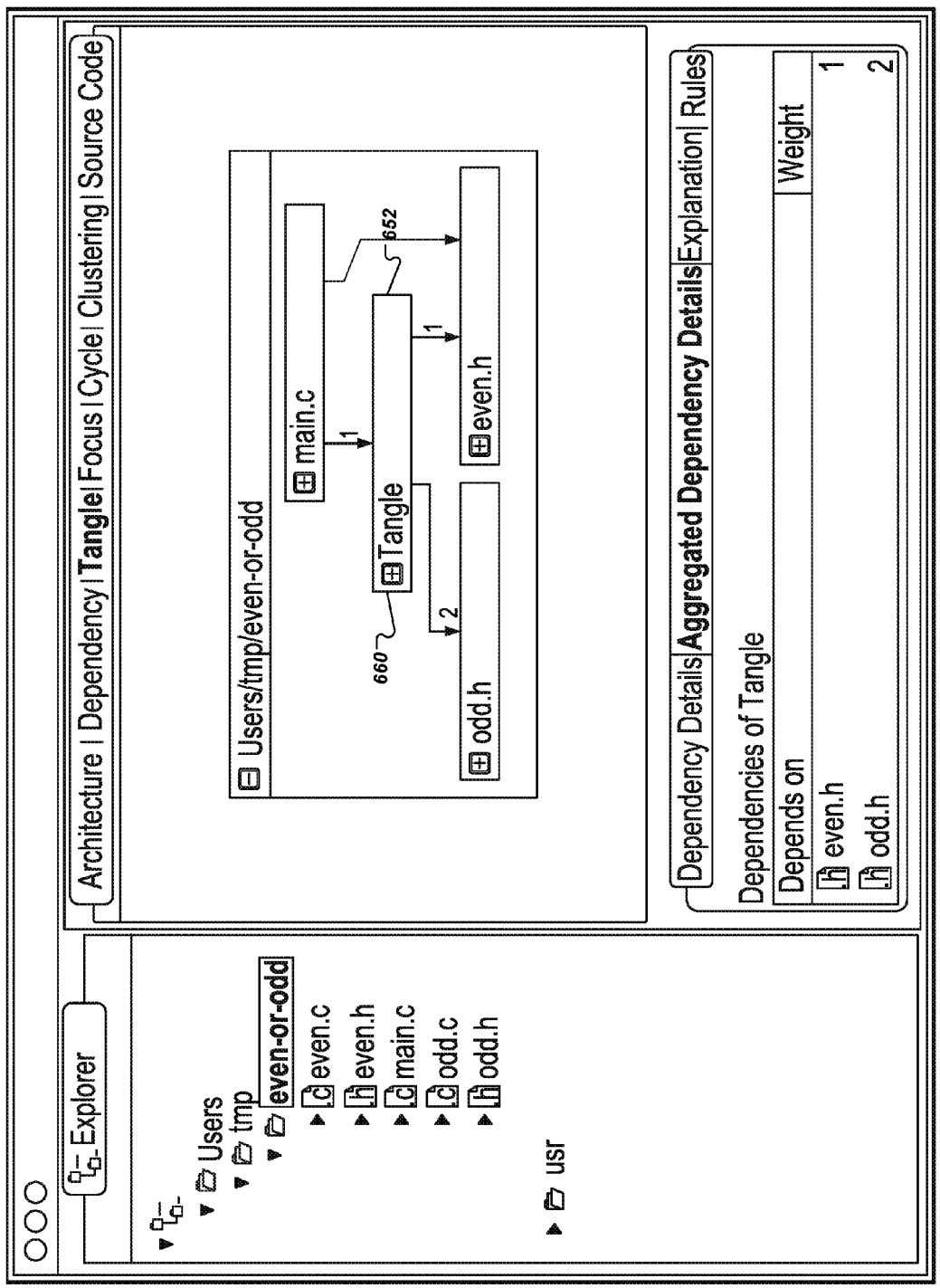

FIG. 6K illustrates a collapsed tangle layout. A tangle is a group of software element nodes that are cyclically connected. A single tangle can include multiple cycles when a particular software element is cyclically connected to multiple cycles.

The system can collapse the nodes in the tangle to represent the tangle as a single tangle node in the aggregated dependency graph. The system can then update the aggregated dependencies to illustrate links between the tangle node and other software elements instead of links between individual software elements of the tangle.

When the system has already classified links in the graph as retained links and candidate removable links, the system can add each node connected to an inbound or outbound removable link to a tangle node. The system can also add nodes that are only connected to other nodes in the tangle to the tangle as well.

FIG. 6K illustrates the same software elements as in FIG. 6A, except with cyclically connected nodes collapsed into a tangle node 652. For example, the tangle node 652 represents multiple nodes that were cyclically connected in FIG. 6A.

When the system collapses all cyclically connected nodes into tangle nodes, the resulting graph is acyclic. For example, the aggregated dependency graph in FIG. 6E is an acyclic graph.

The tangle node 652 in the presentation has a user interface element 660 that allows the user to explore software element nodes in the tangle. In this example, the user interface element 660 is a plus icon, which indicates that the user can select the plus icon to see further software element nodes that are in the tangle.

Figure 6L:
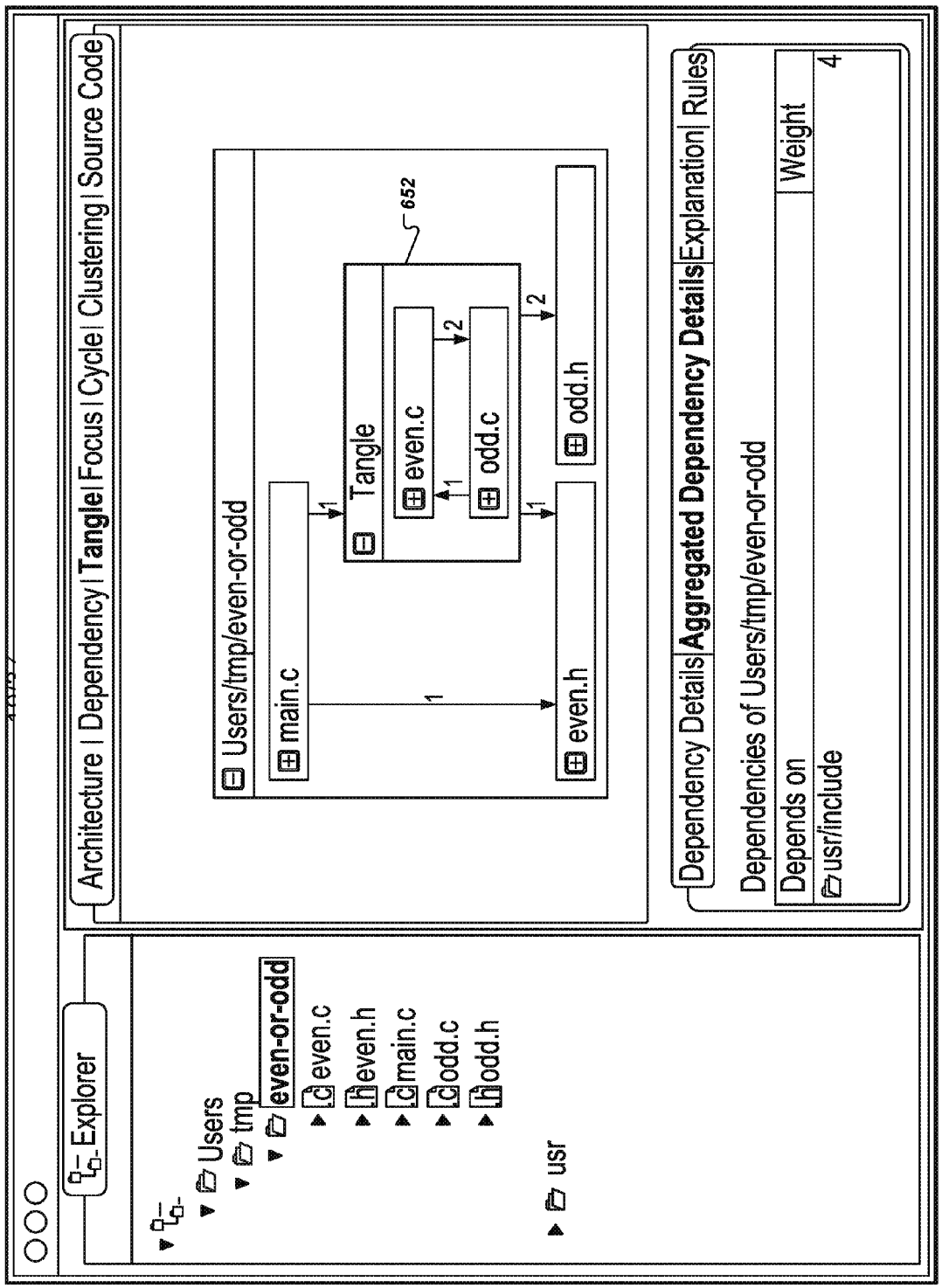

FIG. 6L illustrates an expanded tangle layout. FIG. 6L illustrates the same tangle node 652 that was represented in FIG. 6K. But in FIG. 6L, the tangle node 652 is presented in an expanded view that illustrates all individual software element nodes in the tangle.

The expanded tangle layout shows both (1) aggregated dependencies between the tangle node 650 and other software elements outside the tangle, and (2) aggregated dependencies of the individual software elements inside the tangle.

The expanded tangle layout essentially isolates each tangle as a separate cyclical graph, with each separate cyclical graph represented as an individual tangle node in an acyclic graph. Within the individual tangle nodes, the system can suggest candidate removable links for removal.

A system can use the aggregated dependency techniques described above to assist users in designing and exploring architecture goals for a project. In particular, in addition to generating and displaying aggregated dependency graphs based on the actual hierarchy of software elements in the project, the system can also generate and display aggregated dependency graphs for model architectures specified by a user.

A model architecture is a user-specified hierarchical arrangement of software elements in a project and a set of user-specified rules representing how the user would like dependencies in the project to be arranged. The system can then generate an aggregated dependency graph for a given model architecture and a given set of rules. The aggregated dependency graph can highlight discrepancies between the specified rules of the model architecture and the aggregated dependencies as they occur in the project.

In order to conform the source code in the project to the model architecture, a developer or team of developers must modify the source code so that the dependencies between source code elements correspond to the rules of the model architecture. This procedure may include moving source code files from one portion of the project to another or modifying the source code files to eliminate dependencies that are not allowed by the rules.

There are variety of use cases for a user wanting to specify a model architecture. For example, on some projects, different teams may be responsible for different portions of the project. It may be desirable to structure the dependencies in the project so that none of a first portion developed by a first team depends on any of a second portion developed by a second team. Such an arrangement can simplify and streamline the development process because the work of the first team does not depend on the work of the second team. It may also be desirable for a developer to specify generally that a first portion of the project should not depend on another portion of the project.

Figure 7:
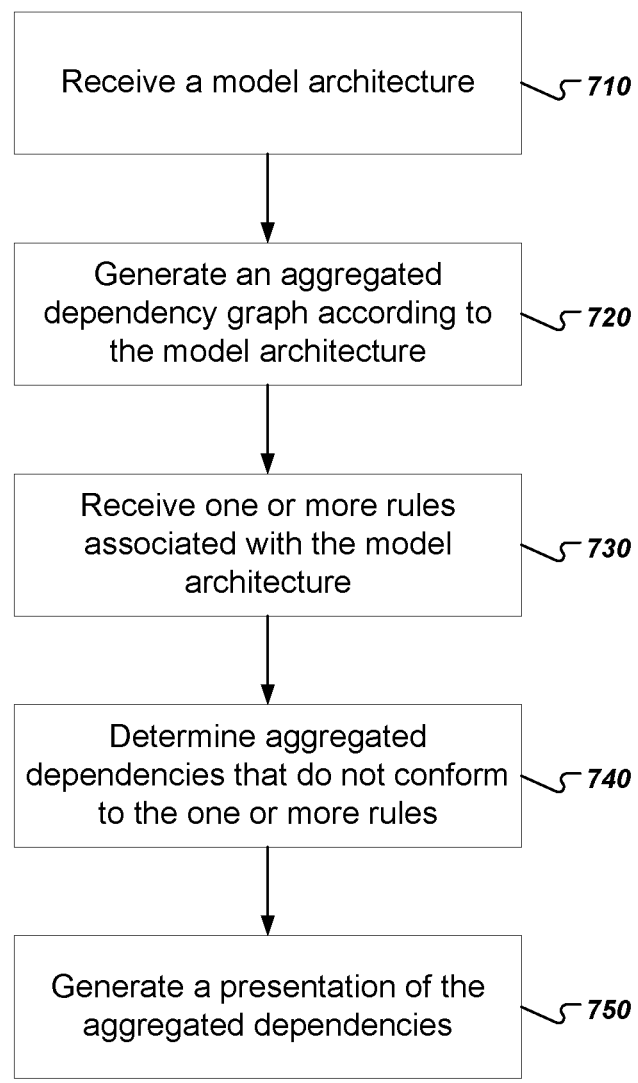
FIG. 7 is a flow chart of an example process for generating an aggregated dependency graph for a model architecture.

FIG. 7 is a flow chart of an example process for generating an aggregated dependency graph for a model architecture. The process will be described as being performed by an appropriately programmed system of one or more computers, e.g., the static analysis system 202 of FIG. 2.

The system receives a model architecture (710). The model architecture is a tree-structured graph that include two types of nodes: group nodes and unit nodes.

Every leaf node in the model architecture is a unit node, and each unit node directly corresponds to one of the elements in the hierarchy graph of the project. In some implementations, unit nodes directly correspond to software element nodes that are files or directories in the build system. When computing aggregated dependencies between nodes in the model architecture, the system will use dependencies of descendants of the unit node's corresponding element in the hierarchy. In other words, each leaf node of the model architecture is a unit node that represents a subtree of the hierarchy.

Every non-leaf node in the model architecture is a group node. Each group node has one or more children, which can be other group nodes or unit nodes.

The model architecture can be specified in a number of ways. For example, a user can create a configuration file that specifies each group node in the model architecture and each of the group node's children, which may include unit nodes.

The membership of group nodes and unit nodes can also be specified by arbitrary regular expressions that the system will evaluate to generate the model architecture. For example, if X, Y, and Z represent files or folders, a user can specify that a particular unit node contains the software elements in (X-Y)+Z.

Software elements of the hierarchy can be shared among multiple different unit nodes. In other words, although the model architecture is a tree structure, the unit nodes at the leaves of the tree structure may correspond to overlapping software elements in the project.

The system can also provide the interactive functionality for the model architecture to be generated interactively by a user within a user interface presentation. For example, in an interactive presentation of an aggregated dependency graph, a user can drag and drop nodes of an aggregated dependency graph to be unit nodes of a model architecture. Thus, a user can drag and drop a particular node of an aggregated dependency graph to be a child node of a particular group node of the model architecture.

In some implementations, a user can specify multiple model architectures for a same project. For example, a user can specify one model architecture for one team, and a second model architecture for another team.

The system can also generate an initial model architecture automatically, and then allow the user to modify the initial model architecture interactively. The system can then generate an initial model architecture that represents the result of the hierarchical clustering algorithm. In some implementations, the system can truncate the resulting model architecture tree at a particular predetermined depth. The user can then interactively modify the automatically generated initial model architecture.

Figure 8A:
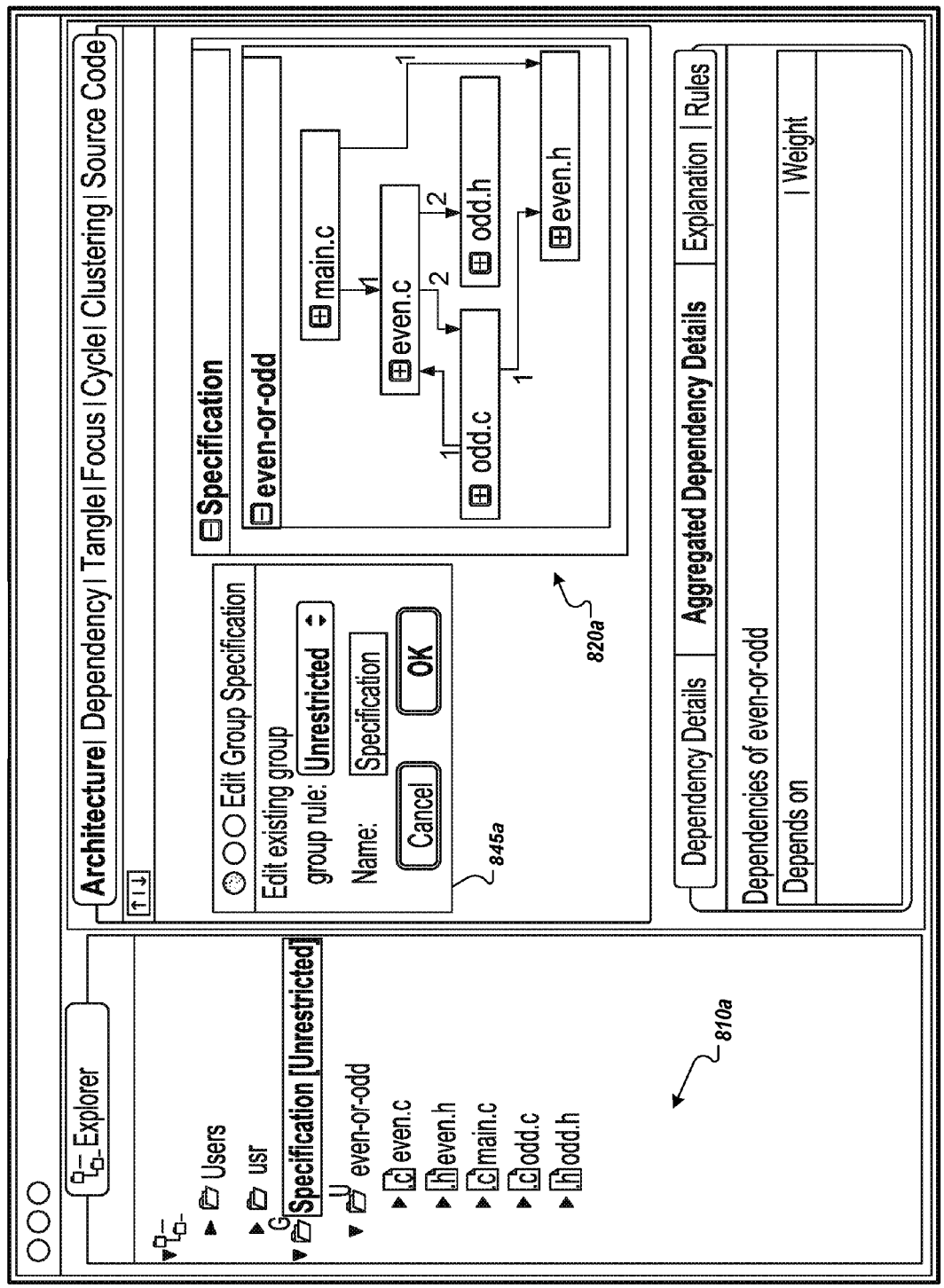
FIG. 8A illustrates an example model architecture and a resulting aggregated dependency graph.

FIG. 8A illustrates an example model architecture 810a and a resulting aggregated dependency graph 820a. The model architecture 810a includes a top-level group node, "Specification," and a unit node, "even-or-odd." The unit node "even-or-odd" corresponds to a subtree of the hierarchy that has five nodes representing the five source code files of the project. As shown in FIG. 8A, the display 810a of the model architecture can show children of unit nodes, in which case the children are nodes in the hierarchy. A user can generate the model architecture 810a by dragging and dropping elements in the aggregated dependency graph pane into the hierarchy explorer.

The system generates an aggregated dependency graph according to the model architecture (720). The system can generate the aggregated dependency graph for the model architecture in a similar to that which is described above for the original hierarchy graph for the system. However, there are two differences. First, because unit nodes represent subtrees of the original hierarchy graph, the computation of aggregated dependencies uses dependency information from both the model architecture and the hierarchy graph. In other words, when obtaining dependencies of descendants of a node in the model architecture, the leaf nodes of the model architecture are not necessarily the end point. Rather, the system can continue gathering dependencies of descendants for elements in the hierarchy that occur in a subtree represented by the leaf node of the model architecture. Second, because group nodes may not directly correspond to elements of the hierarchy, the aggregation of group node dependencies may include solely dependencies of descendants of the group node in both the model architecture and the hierarchy graph.

Thus, a dependency exists between a first node and a second node in the model architecture when a first software element represented by or contained by the first node, or any of the first node's descendants in the model architecture or in the hierarchy graph, depend on a second software element represented by or contained by the second node, or any of the second node's descendants in the model architecture or in the hierarchy graph.

As shown in FIG. 8A, the aggregated dependency graph 820a illustrates all of the unit nodes of the model architecture 810a, rather than elements of the original hierarchy graph. In this example, no rules have been specified. Thus, the system can present the group nodes and unit nodes of the aggregated dependency graph 820a in any appropriate ordering.

The system receives rules associated with the model architecture (730). The user can specify a variety of rules for the model architecture that specify how a user would like the dependencies of the project to be arranged.

The system determines aggregated dependencies that do not conform to the rules (740), and the system generates a presentation of the aggregated dependencies (750). When dependencies in the project do not conform to the rules, the system can visually distinguish the discrepancies in order to help a user identify how the project can be modified so that it conforms to the specified rules.

The system can compute a count of aggregated dependencies that do not conform to the rules and provide the count for display within the presentation. This allows a user to see a quantitative measure of how far away the project is from the model architecture. The system can also compute a difference between a current count and a previously computed count of aggregated dependencies that do not conform to the rule and provide the difference for display within the presentation. This allows the user to see progress toward the model architecture.

The various types of rules that a user can specify for a model architecture will now be described in more detail. Some rules for the model architecture can be implicit in the definition of the model architecture. For example, in some implementations, the model architecture specified by the user has an implicit ordering among sibling nodes. This ordering represents a set of rules specifying that no unit node should have an aggregated dependency on a previous unit node in the order.

Figure 8B:
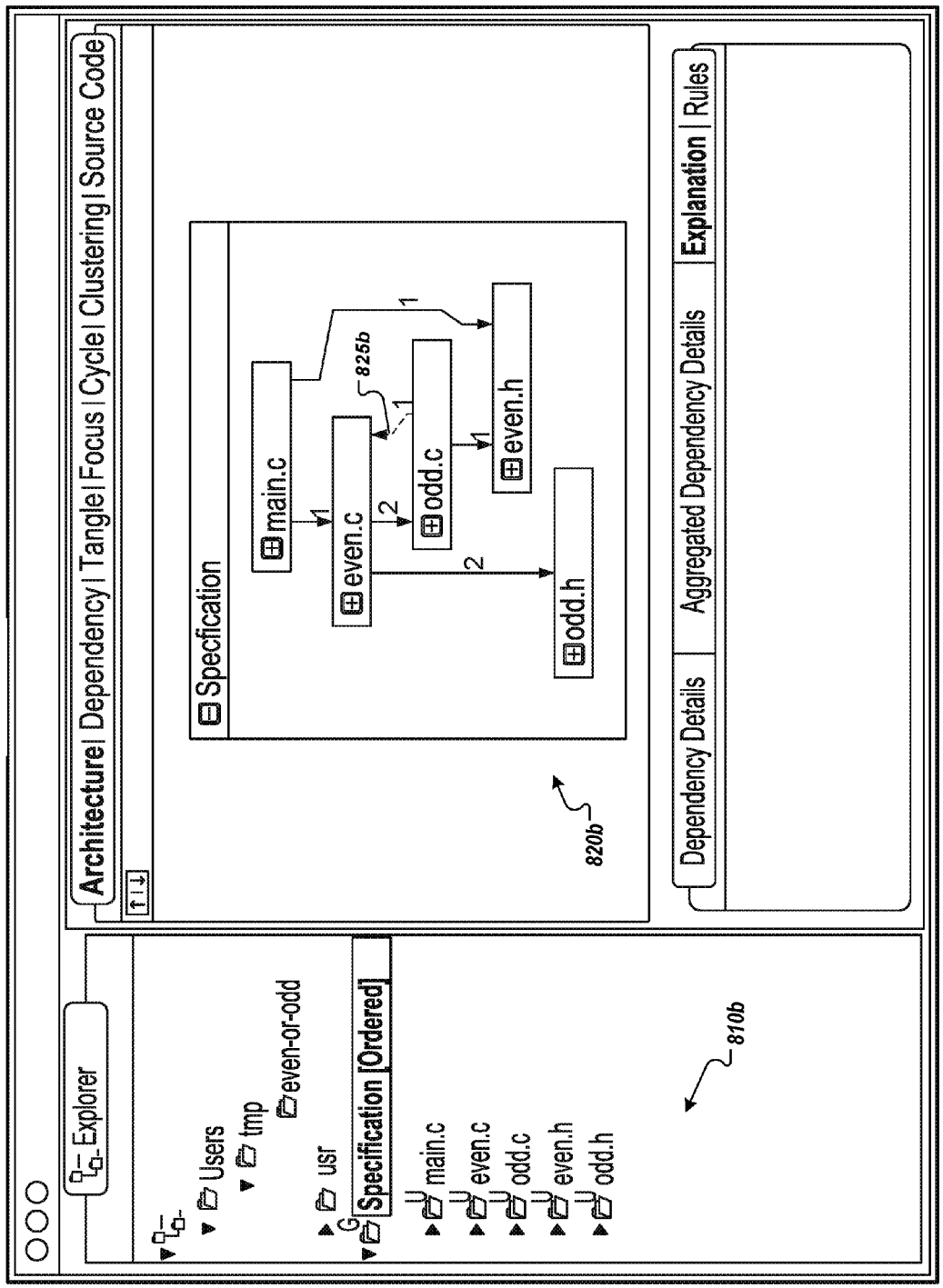
FIG. 8B illustrates a model architecture with ordering rules

FIG. 8B illustrates a model architecture 810b with ordering rules. The model architecture 810b specifies an implicit ordering among the sibling unit nodes "even.c," "even.h," "main.c," "odd.c," and "odd.h." That is, by generating this arrangement of unit nodes, the user specifies that a last unit node in the order, "odd.h", should not depend on any of its sibling nodes in the model architecture 810b.

The system can use the ordered specified in the model architecture to generate the presentation of the aggregated dependency graph 820b. For example, in the aggregated dependency graph 820b, the ordering of the nodes from top to bottom corresponds to the ordering of the nodes in the model architecture 810b.

As shown in the aggregated dependency graph 820b, the unit node for "odd.c" has a dependency on a previous unit node in the order, "even.c," which violates the implicit ordering rule specified by the model architecture. Thus, the system visually distinguishes the dependency 825b between the node representing odd.c and the node representing even.c.

Figure 8C:
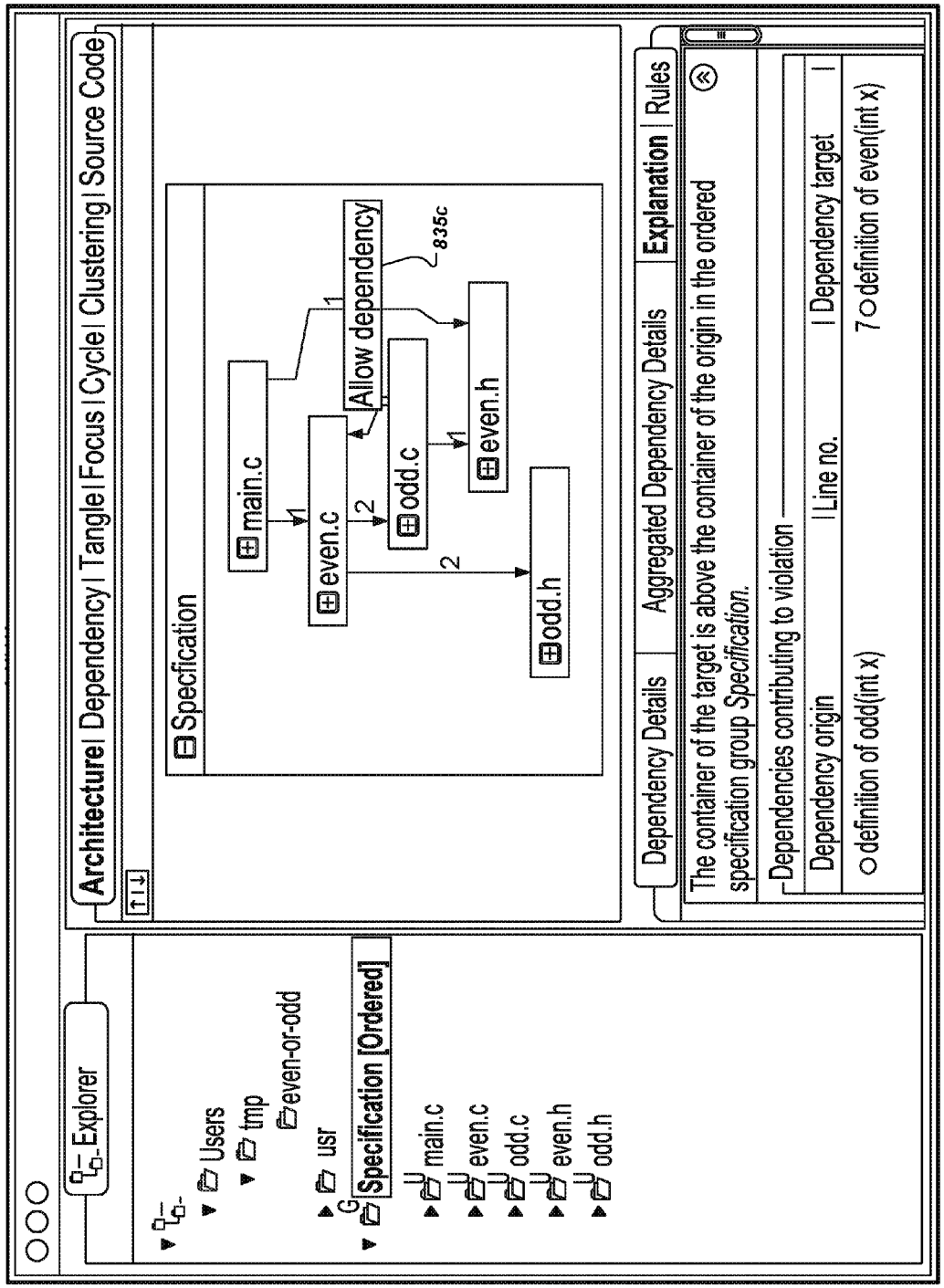
FIG. 8C illustrates explicitly allowing a particular dependency.
Figure 8D:
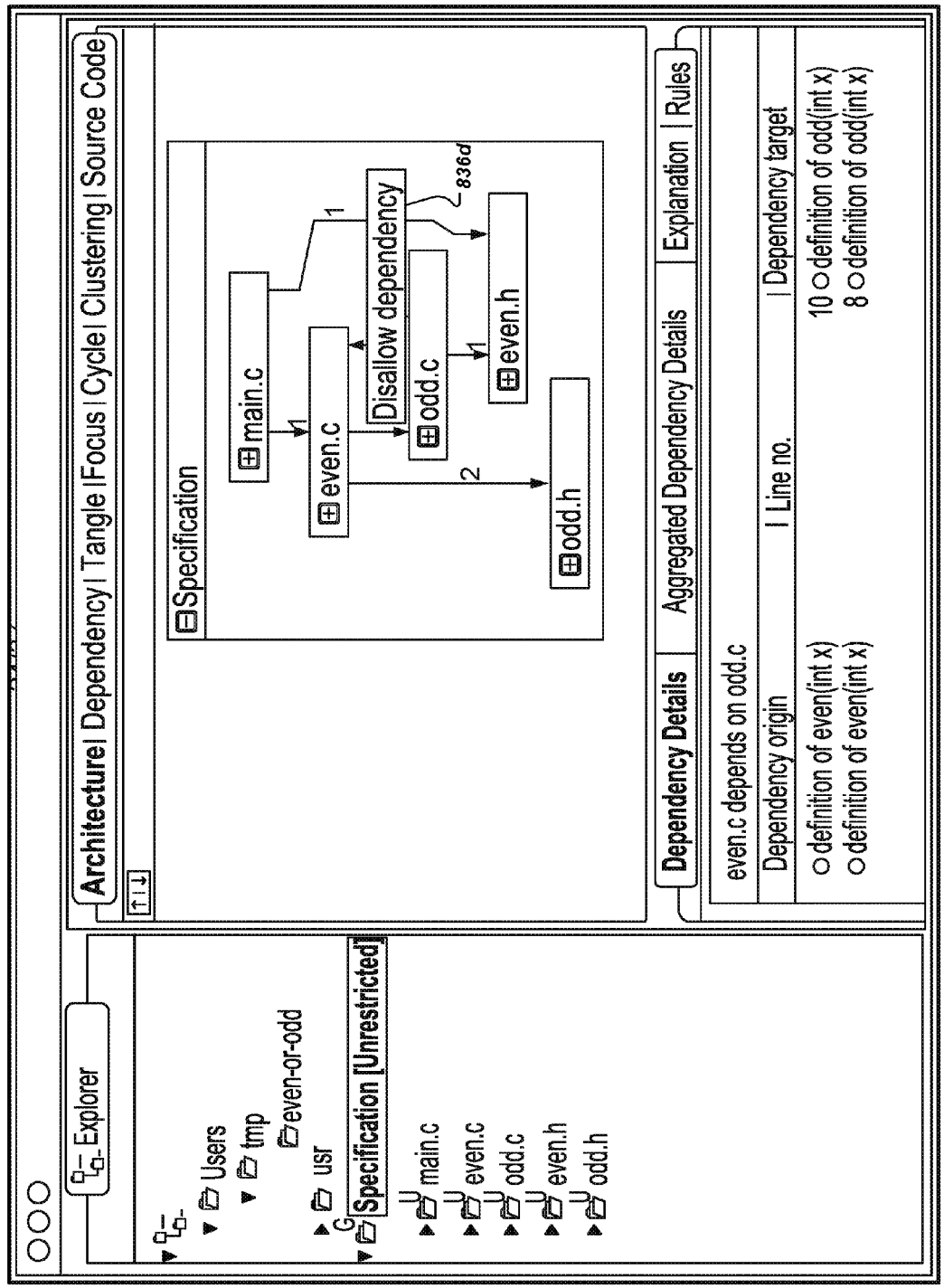
FIG. 8D illustrates explicitly disallowing a particular dependency using user interface element.

Some rules are dependency specific. For example, a user can explicitly allow or disallow a particular dependency. FIG. 8C illustrates explicitly allowing a particular dependency. The user can, for example, select the dependency and choose a user interface element 835c that allows the user to specify that that dependency is explicitly allowed. If a dependency is explicitly allowed, the system can suggest other dependencies as candidates for removal. Explicitly allowing or disallowing dependencies can help the user to focus on dependencies that are good candidates for removal. Similarly, the system can also allow a user to explicitly disallow a selected dependency. FIG. 8D illustrates explicitly disallowing a particular dependency using user interface element 836d.

The system can also allow the user to categorize some dependencies as "undetermined." Thus, if the user is in the process of determining which dependencies are allowed and which are forbidden, the system can allow the user to make some dependencies "undetermined" to indicate that the dependency is a candidate for being labeled as forbidden.

A user can also specify one or more explicit rules. An explicit rule specifies a set of source nodes, a set of target nodes, and an indication of whether dependencies that match the explicit rule are forbidden or allowed. Then, if any dependencies exist in the aggregated dependency graph from any of the source nodes to any of the target nodes, the system will treat the dependency as forbidden or allowed according to the rule.

A user can also associate each group node with one or more of a set group rules, which imposes a desired property for dependencies among children of a particular group node. In some implementations, a group rule for a group node is automatically applied to all children of the group node, even when additional children are added to the group node. Each group rule can help a user to achieve a different design goal for a particular project.

One group rule has already been described above, which is an ordering between sibling nodes of children of the group node. The ordering group rule is useful to ensure that children within a group do not have any cycles. In other words, by ordering the children in a group, a user can implicitly forbid cycles within the group without having to manually specify which cycles are not allowed.

The ordering group rule is also useful for intuitively specifying a layering of software elements that should remain separated. For example, a user could specify an ordering to segregate a user interface layer from a data storage layer. The user interface layer could depend on the data storage layer, but the data storage layer cannot depend on the user interface layer.

One example group rule is "Independent," which specifies that dependencies among siblings in the group are forbidden. This group rule is useful when the user wants to segment a project into completely modular units that should never depend on each other.

Another example group rule is "Private," which specifies that dependencies from outside the group to any children of the group are forbidden, while dependencies among children of the group are permitted. This group rule is useful when the user wants to hide portions within a module from other software elements outside the module. For example, one module of a project could contain both code for an application programming interface (API) as well as implementation code of the API. A user could then use a model architecture to enforce the design convention that other modules should depend on the public API but not on the implementation code. A user could easily impose a rule for this design convention by marking the implementation code as private. Then, the system would automatically identify when any other modules had dependencies on the implementation code.

Another example group rule is "Acyclic," which specifies that dependencies among children of a group cannot contain any cycles. If the children of a group contain cycles, the system can suggest cycles for removal, for example, as described above with reference to FIG. 5.

Finally, a user can specify that a group node is "Unrestricted," meaning that all dependencies are allowed. For example, user interface element 845a of FIG. 8A allows the user to specify that the group node "Specification" is an "Unrestricted" group, which is reflected in the hierarchy explorer.

Figure 8E:
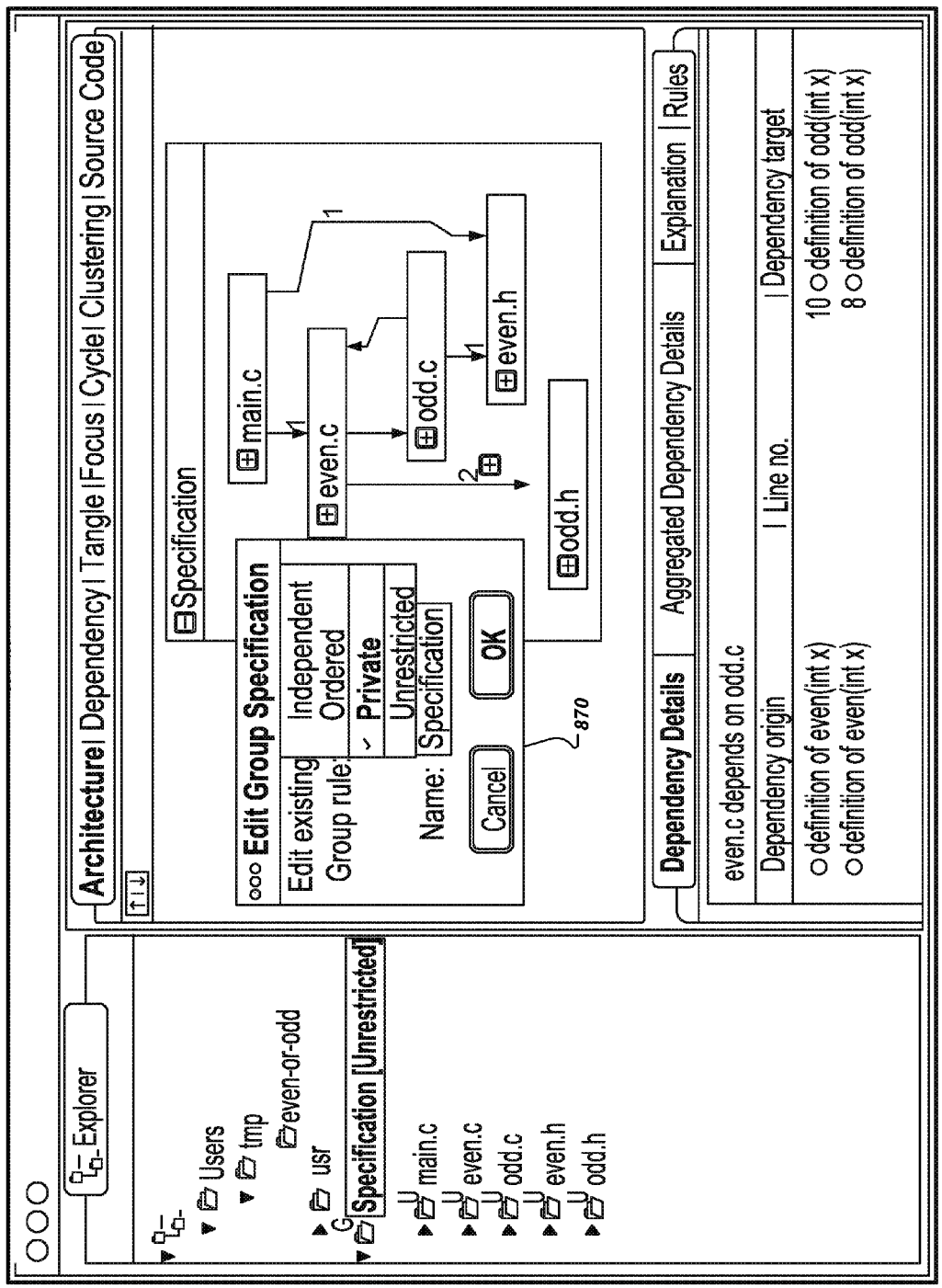
FIG. 8E illustrates a user interface element that allows a user to select different types of group rules for the model architecture.

FIG. 8E illustrates a user interface element 870 that allows a user to select different types of group rules for the model architecture. In this example, the user has selected the group rule "Private."

The system may visually distinguish different dependencies according to different group rule types that are violated. For example, all dependencies that are identified as disallowed because they violate the "Acyclic" rule can be displayed in a different color or style than other dependencies. This can aid the user in understanding the structure of the model architecture and how some of the dependencies are identified as forbidden.

A user can also define categories of group rules and explicit rules and can then select categories of rules whose violations should be displayed, removed, or highlighted. The system can also visually distinguish the categories from each other when displaying the dependencies, and can also display the different categories in other analysis tools.

A user can also define group and explicit rules in terms of dependency categories. For example, between two nodes A and B, a user can explicitly allow a category corresponding to function call dependencies. Between two other nodes C and D, a user can explicitly disallow a category corresponding to macro dependencies.

A user can also specify a combination of different types of rules. For example, a user can specify a group rule that applies to all children of a group node. The user can then refine the group rule for some children of the group node by specifying explicit rules that apply only to those children of the group node. For example, the user could specify "allow" rules for individual nodes that override things that the group rule would otherwise consider to be forbidden. A user may also specify that multiple group rules should be applied to a single group node.

The system can assign a priority to rules in case some combinations of rules conflict with one another. For example, a root group node may be associated with one type of group rule, and a child group node may be associated with another type of group rule. To resolve the conflict, the system can specify that group rules associated with group nodes that are closer to the root node of the model architecture override group rules associated with group nodes that are lower down in the model architecture.

In some implementations, a user can explicitly specify a priority among rules. For example, a user may specify that it is more important for a particular portion of a project to have the "Private" rule type than for that portion of the project to have the "Acyclic" rule type. To do so, the user can assign a higher priority level to the group rule for the project. Thus, if any parent group nodes happen to have the "Acyclic" rule type and the rule type conflicts with the higher priority rule type, the system can resolve the conflict in favor of the rule type having the higher priority.

A user can also use existing rules to build new rules. For example, a user can define a new group rule that references two existing explicit rules.

A user can also assign names to sets of group nodes and unit nodes, which may then be referenced by rules. For example, the system may assign a name "driver" with a particular set of unit nodes that represent driver source code. The system may then reference the name of the set of unit nodes when defining a group or an explicit rule that will apply to the set of unit nodes. This allows users to more easily build up libraries of useful rules for a particular project.

The names assigned to sets of group nodes and unit nodes in one model architecture can also be referenced in other model architectures for a same project. For example, a rule can assign a name to a first portion of a software project handled by a particular team, which first portion may be represented by a unit of one model architecture. A second model architecture can use a rule that specifies the name of the first portion. As an example, the second model architecture can include a rule that specifies that the work of a particular team of developers cannot depend on the first portion of the project.

As part of the interactive presentation, the system can also present metrics that indicate progress toward the model architecture. For example, the system can compute a number of allowed, undetermined, and disallowed dependencies in the aggregated dependency graph for the model architecture. The system can then present these metrics alongside the aggregated dependency graph, which can aid developers in tracking their progress.

One example metric is a number of pairs of group nodes and unit nodes for which dependencies would not be disallowed, regardless of whether any dependencies between the pairs exist. This metric is an indication of how modular the group nodes and unit nodes are from each other.

Another example metric is a number of pairs of group nodes and unit nodes for which dependencies would be allowed. This metric can indicate how easy it would be to undertake further development that ties the nodes of the model architecture together. If there are relatively few pairs for which the dependencies would be allowed, the metric would be small, and further development would likely introduce more disallowed dependencies. On the other hand, if there are relatively many pairs for which the dependencies would be allowed, the metric would be large, and further development would not be as likely to introduce disallowed dependencies.

A static analysis system can provide highly customizable definitions of dependencies by using queries to define the dependencies. Using queries to define dependencies provides a natural mechanism for rich dependency categorization. In addition, using queries is typically faster and clearer than specifying dependencies using a general purpose programming language. Furthermore, using queries makes the system easier to update or extend to support new language features.

The rich categorization of dependencies can be used in an interactive presentation of aggregated dependencies. For example, different categories of dependencies can be visually distinguished in the presentation. Furthermore, some categories of queries can be turned on or off.

Using queries to define dependencies also allows additional categories of dependencies to be added to the system. This allows the system to be readily customized for particular projects or particular programming languages.

Figure 9:
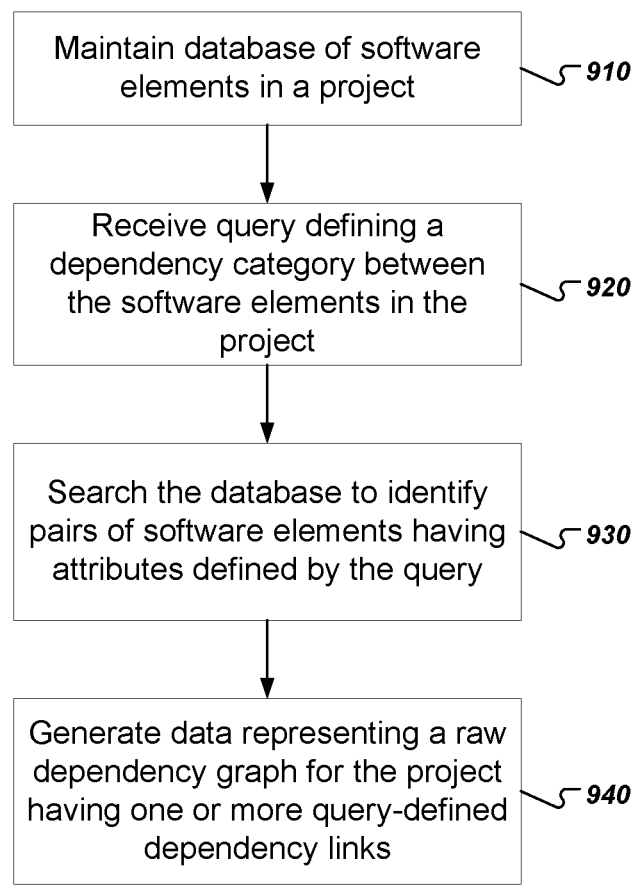
FIG. 9 is a flow chart of an example process for identifying query-defined dependencies in the project.

FIG. 9 is a flow chart of an example process for identifying query-defined dependencies in the project. The example process will be described as being performed by an appropriately programmed system of one or more computers, e.g., the dependency engine 230 of FIG. 2.

A static analysis system can provide highly customizable definitions of dependencies by using queries to define the dependencies. Using queries to define dependencies provides a natural mechanism for rich dependency categorization. In addition, using queries is typically faster and clearer than specifying dependencies using a general purpose programming language. Furthermore, using queries makes the system easier to update or extend to support new language features.

The rich categorization of dependencies can be used in an interactive presentation of aggregated dependencies. For example, different categories of dependencies can be visually distinguished in the presentation. Furthermore, some categories of queries can be turned on or off.

Using queries to define dependencies also allows additional categories of dependencies to be added to the system. For example, a system can use non-source code files, e.g., XML or JSON configuration files, to generate query-based dependencies. The system also allows users to add additional categories of dependencies that are specific to their project or code base.

The system maintains a database of software elements in a project (910). The system can populate the database during an extraction process that analyzes source code of the project. The system can determine a variety of attributes of each software element in each source code file used during the build process and populate the database with such attributes.

For example, in a particular source code file, the system can identify all function calls and associate an entry in the database for the source code file with each of the function calls in the source code file. The system can associate each function call with attributes of the function call, e.g., a name of the function called, the number and types of arguments used, a location within a source code file in which the function call occurred, to name just a few examples.

The system can populate the database with any appropriate attribute for software elements in the project. Other example attributes include variables used, static variables declared, type definitions, type declarations, include directives, macro invocations, template instantiations, and namespace declarations. In general, the attributes the system stores in the database are programming language dependent. In other words, the system can populate the database with different attributes for different programming languages.

The system receives a query defining a dependency category between the software elements in the project (920). Queries allow a raw dependency graph to be customized for any appropriate project, build system, or programming language. The query can be either one of a set of standard queries supplied by the system or a custom, user-defined query.

The aggregated dependency graph can thus be similarly customized by adding or removing queries that define the raw dependencies in the project. The aggregated dependency graph will thus also reflect the user-defined dependencies between the software elements in the project.

Each query that defines a dependency category specifies one or more source attributes, one or more target attributes, and a relationship between the source attributes and target attributes.

The source attributes include one or more attributes of a source software element of the user-defined dependency. The source attributes thus identify which of the software elements in the database are eligible to be a source software element of the user-defined dependency. For example, if the query defines an "include" dependency between a first software element and a second, the source attributes would be that (i) the first software element has an "include" statement, and (ii) the name of the file that is included.

The target attributes include one or more attributes of a target software element of the user-defined dependency. The target attributes thus identify which of the software elements in the database are eligible to be a target software element of the user-defined dependency. If the query defines an "include" dependency, the target attributes would simply include the name of the software element.

The query also defines a relationship between the source attributes and the target attributes. In the "include" dependency example, the relationship would be that the name of the file included by the source software element is equal to the name of the target software element.

The following example query identifies dependencies from function calls to function definitions:
  from MethodAccess call, Method methodTarget
  where methodTarget=call.getCallee( )
  select call, methodTarget In this example, the system searches the database for all instances where a function definition is referenced by a function call.

Another example query identifies dependencies from methods depending upon the types declared in the method parameters:

```
from Method source, RefType target
where
    exists(Parameter p |
        source.getAParameter( ) = p and
        usesType(p.getType( ), target)
    )
select source, target
```

In this example, an "exists" quantifier identifies parameters associated with each method. Then, a utility predicate "usesType" unwraps generic types so that if the parameter type is "List<Foo>" the method depends on both the "List" and "Foo" types.

The system searches the database to identify pairs of software elements having the attributes defined by the query (930). The system can identify source software elements having the one or more source attributes of the query and target software elements having the one or more target attributes of the query. The system can then identify pairs of software elements when the relationship specified by the query is satisfied by attributes between software elements.

The system generates data representing a raw dependency graph for the project, the raw dependency graph having one or more query-defined dependency links (940). The system can generate a new raw dependency graph or supplement an existing raw dependency graph, e.g., the raw dependency graph as described above with reference to FIG. 1B.

After including the user-defined dependency in the raw dependency graph, the system can generate or update an aggregated dependency graph and an associated interactive presentation. Thus, a user can easily add user-defined dependencies for a project that will appear in the interactive presentation.

Because the aggregated dependencies are defined as a set union of dependencies inbound to or outbound from a particular node in the hierarchy, query-dependencies provide a powerful and flexible extension mechanism. In other words, once a user defines a new query that defines dependencies in a project, the mechanism for computing aggregating dependencies automatically integrates the newly defined dependencies into the aggregated dependency graph and its associated user interface presentation, all without the user having to specify any relationship to any other dependency categories.

Because the system can define the user-defined dependencies in separate categories, the system can visually distinguish user-defined dependencies from other dependencies in the project. For example, the system can present the user-defined dependency links in a different color, a different style, or a different line thickness, to name just a few examples.

The system can also provide user interface elements that allow a user to turn particular categories of queries on and off. For example, a user may turn off dependencies that are uninteresting because they involve low-level source code elements. For example, a user may want to turn off link-time dependencies for C++ projects. As another example, some libraries use macros defined by a caller in order to configure their functionality. If turned on, these dependencies may appear as dependencies from the library to user code, which can be misleading. Thus, a user can turn off macro dependencies to disable the display of these dependencies.

Figure 10A:
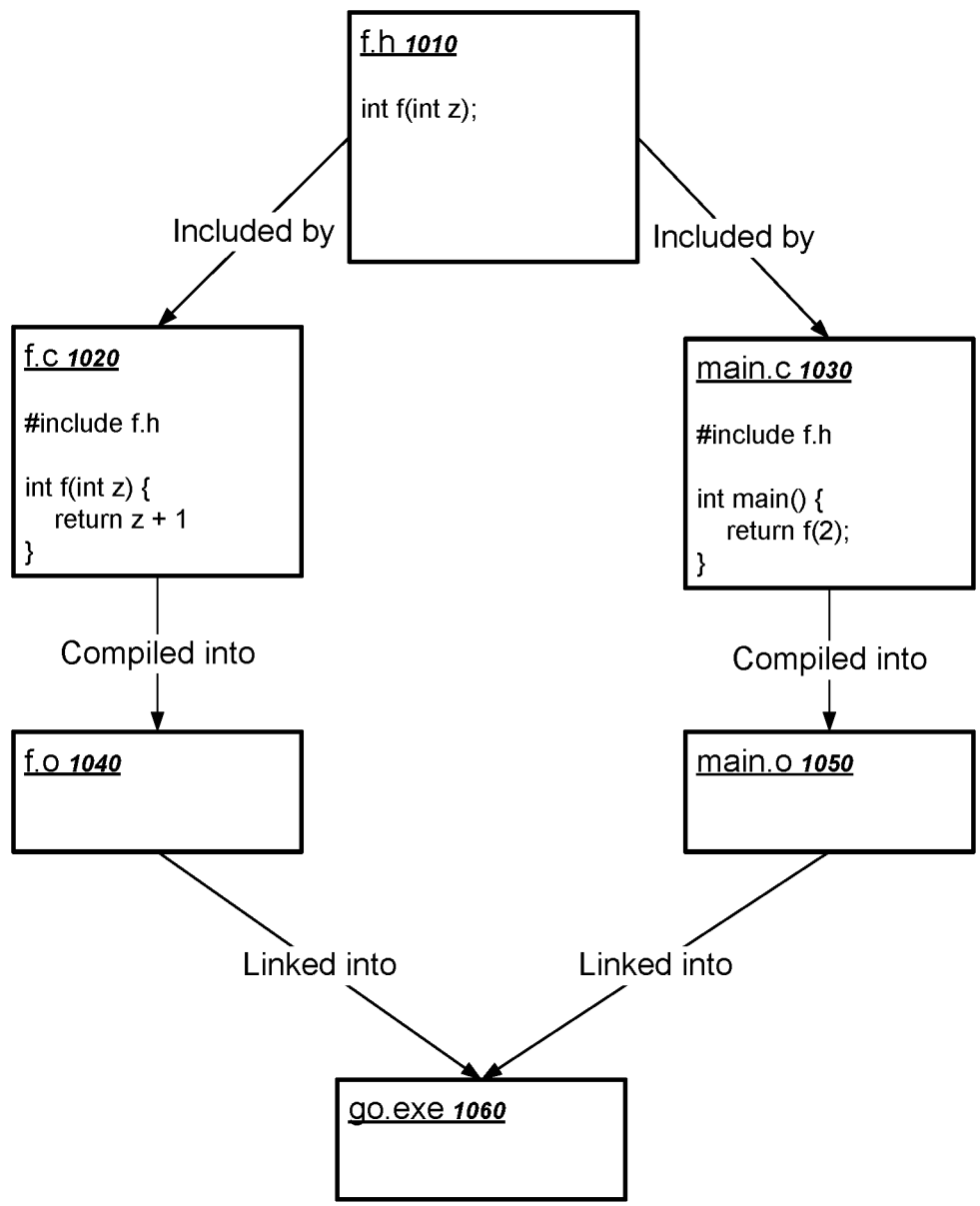
FIG. 10A illustrates files involved in a simple project.
Figure 10B:
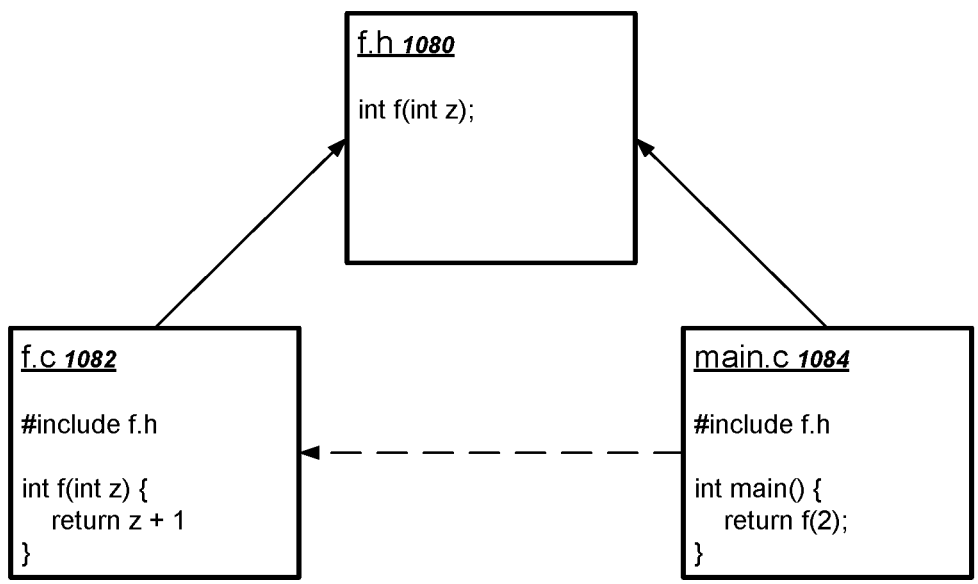
FIG. 10B illustrates an example raw dependency graph.

One example of using queries to define new dependency categories in a project involves using queries to define link-time dependencies in a project. FIGS. 10A and 10B illustrate an example of using queries to define link-time dependencies in a project. Link-time dependencies are dependencies between software elements in the project that arise only due to symbols being resolved by a linker during a build of the project. The static analysis system can include a query that adds link-time dependencies to the raw dependency graph and therefore, to the aggregated dependency graph for the project. Because the query defines a separate category of dependencies, a user can easily turn on or turn off link-time or compile-time dependencies or both.

FIG. 10A illustrates files involved in a simple project. The arrows in FIG. 10A represent how the files would be related and used by a build system.

The project includes a header file f.h 1010 that declares a function f. The project includes a first source code file main.c 1030 that calls the function f and a second source code file f.c 1020 that includes the definition of the function f. Each of f.c 1020 and main.c 1030 include f.h 1010.

When a build system builds the example project, a compiler will compile f.c 1020 into f.o 1040 and main.c 1030 into main.o 1050. At this point, the call to function f in main.o is still unresolved. In other words, the definition of the function f will be supplied by f.o 1040 at link time.

Thus, a linker links f.o 1040 and main.o 1050 to produce a target, go.exe 1060. In this example, the target is an executable file, but the target could also be a library. At link time, the definition of the function f in f.o 1040 is linked to the call to the function f in main.o 1050. Thus, when go.exe 1060 is executed, the call to f will succeed.

In an aggregated dependency graph for exploring the structure of the project, it would seem natural for there to exist a dependency between main.c 1030 and f.c 1020 because source code in main.c 1030 references source code in f.c 1020. However, no such compile-time dependency is generated because the file main.c 1030 makes no reference to the file f.c 1020. This is because the definition of the function f could be supplied by any of a number of object files at link time.

Thus, the system can use a query that defines link-time dependencies between software elements of the project. In this example, the source attributes of the query include (1) the symbol name referenced in each file, and (2) a link-time target of each file. In this example, the database would include, for main.c 1030, at least the symbol name "f" for the function f referenced in main.c 1030, as well as the name of the link-time target, go.exe 1060.

The target attributes of the query include (1) the symbol names defined in each file, and (2) a link-time target of each file. In this example, the database would include, for f.c 1020, at least the symbol name "f" for the function f defined in f.c 1020, as well as the name of the link-time target go.exe 1060.

The query would also include a relationship between the source attributes and the target attributes. In this example, the relationship would specify that (1) the source element link target is equal to the target element link target, and (2) that the name of a symbol referenced in the source element is equal to the name of a symbol defined in the target element.

The query needs to specify both items of information because the symbol name "f" alone is insufficient to determine the dependency of main.c 1030 on f.c 1020. This is because the definition of the function f could be supplied at link time by other functions. In some build systems, this information is only known at link time.

After executing the query on the database, the system can identify that main.c 1030 references a function defined in f.c 1020. Therefore, the system can generate a dependency in a raw dependency graph between a node representing main.c 1030 and a node representing f.c 1020.

FIG. 10B illustrates an example raw dependency graph. In FIG. 10B, the dependency graph has a first node 1080 representing the file f.h, a second node 1082 representing the file f.c, and a third node 1084 representing the file main.c. Include dependency links exist from the node 1082 to the node 1080 and from the node 1084 to the node 1080.

The system also includes a link-time dependency from the node 1084 to the node 1082. In the raw dependency graph or in an aggregated dependency graph, the system can visually distinguish link-time dependencies from compile-time dependencies. For example, the FIG. 10B, the link-time dependency is represented by a dashed line, while the compile-time dependencies are represented by solid lines.

The query-based framework for adding dependencies can be used to add dependencies in a project that are unavailable in other systems. In particular, queries can be used to add implicit dependencies. An implicit dependency is a dependency from a source software element to a target software element such that building the source software element would not fail at compile time or link time due to the absence of the target software element.

Rather, implicit dependencies are introduced by other aspects of the code base, e.g., libraries, frameworks, or runtime configuration files. In other words, if there is an implicit dependency between A and B, the compile-time and link-time behavior of the build system would function as intended for A even in the absence of B. Examples of implicit dependencies include dependencies induced by remote procedure calls, runtime configuration files, reflection, runtime type registration, and dependency injection.

Figure 11:
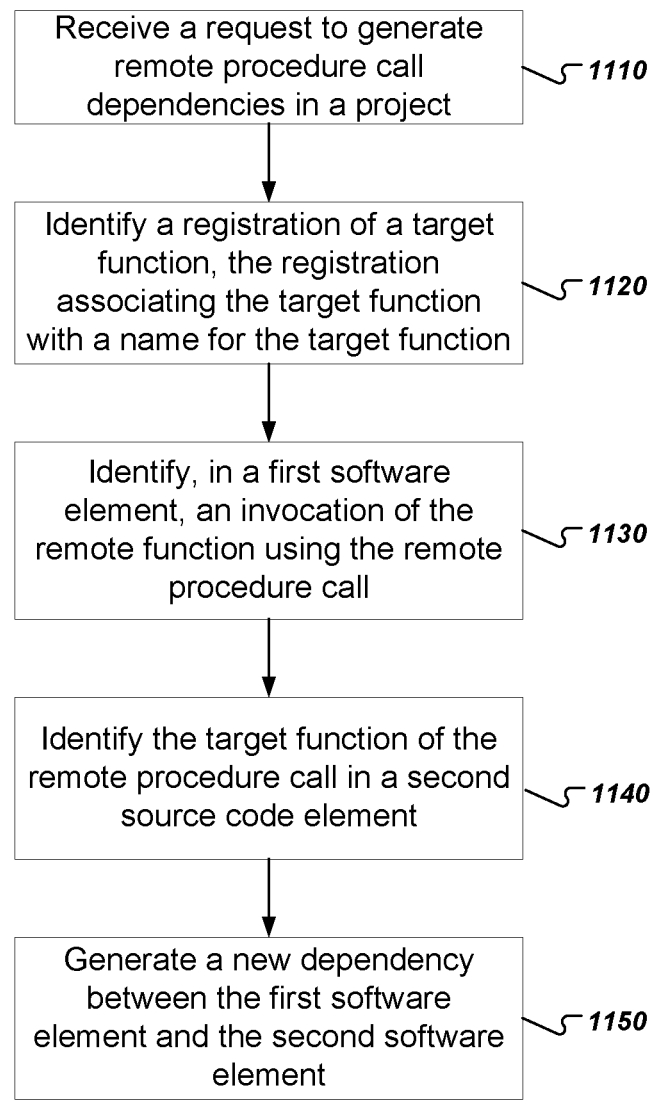
FIG. 11 is a flow chart of an example process for generating an implicit dependency introduced by a remote procedure call.

FIG. 11 is a flow chart of an example process for generating an implicit dependency introduced by a remote procedure call. The system can match string identifiers of remote procedure calls in order to define a dependency between an invocation of the remote procedure call and the target function of the remote procedure call. The process will be described as being performed by an appropriately programmed system of one or more computers, e.g., the dependency engine 230 of FIG. 2.

The system receives a request to generate remote procedure call dependencies in a project (1110). A remote procedure call framework provides the functionality for a first software process to call a function that is executed by a different software process, which may be executing on a different machine than the first software process. The first software process waits for the second process to execute the function and return a result, at which point the first software process resumes execution. Thus, from the perspective of the first software process, the remote procedure call behaves exactly as a purely local procedure call.

Remote procedure call frameworks generally include three components. First, a target function is defined. The target function is the function that will be called remotely by a first software process. Second, the remote procedure call framework associates the target function with a name, which in some cases can be any arbitrary string. The process of associated the target function with a name is called registration. Third, the remote procedure call is invoked by providing, to an invocation function, the name associated with the target function during registration.

When the remote procedure call is invoked, the remote procedure call framework handles the interprocess and network communication that may be required to route the request from the calling software process to the software process that will execute the target function.

Figure 12:
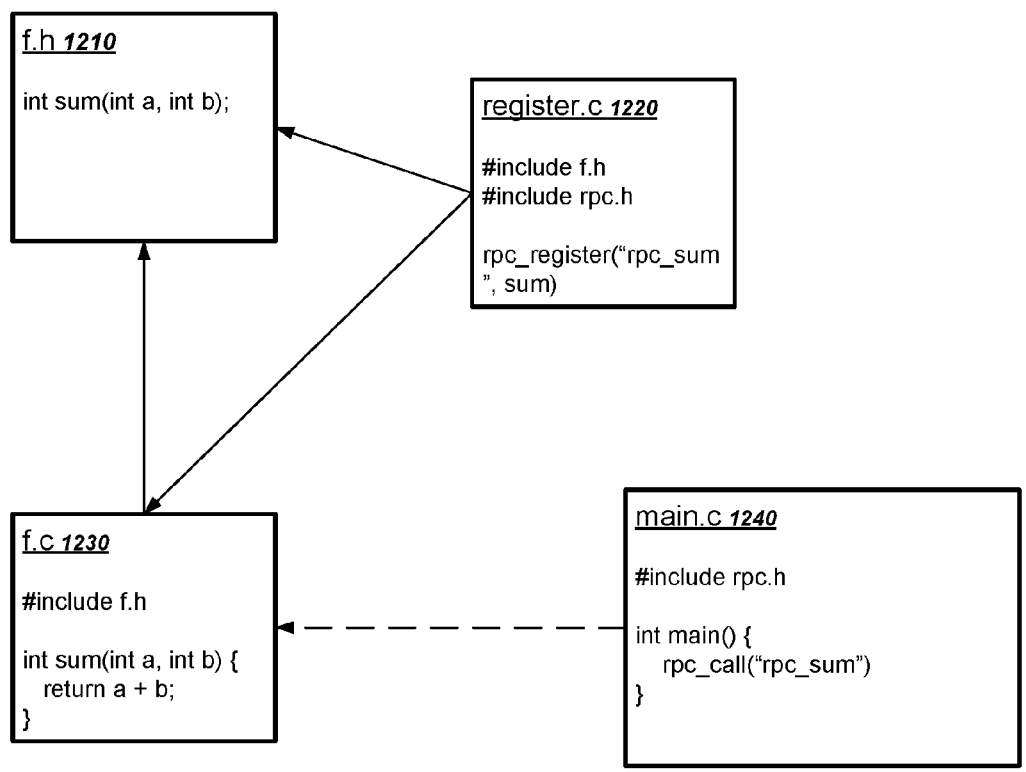
FIG. 12 illustrates example pseudocode source files that use a remote procedure call.

FIG. 12 illustrates example pseudocode source files that use a remote procedure call. The files make use of a remote procedure call framework defined in rpc.h.

The target function "sum" is defined in f.c 1230 and declared in f.h 1210. The target function is registered by register.c 1220, which includes associating the target function with a string "rpc_sum."

The file main.c 1240 invokes the remote procedure call by specifying the string "rpc_sum" that was associated with the target function during registration.

Solid lines in FIG. 12 represent dependencies that exist at compile time or link time. Notably, even though main.c 1240 will execute a remote procedure call to the target function in f.c 1230, there is no compile-time or link-time dependency between main.c 1240 and f.c 1230. This is because even in the absence of f.c, main.c 1240 will compile perfectly and can be linked perfectly. This is because the string identifier "rpc_sum" is treated by the compiler and linker as merely an argument value rather than a function identifier.

As shown in FIG. 11, the system identifies a registration of a target function, the registration associating the target function with a name for the target function (1120). To identify the registration of a target function, the system can identify common registration functions provided by a remote procedure call framework.

For example, the system can query the database to obtain function names and their arguments. If a function name corresponds to a remote procedure call registration function, the system obtain the arguments to the function. The arguments will specify the name associated with the remote procedure call as well as the target function of the remote procedure call.

The following example query in an object-oriented query language identifies a registration in the XML RPC framework:

```
/**
 * A registration of an XML-RPC remote call target.
 */
class XMLRPCRegistration extends FunctionCall {
    XMLRPCRegistration( ) {
        /*
         * A registration is a call to the "addMethod" member
         * function of the xmlrpc_c::registry class.
```

```
        * Two forms of this method are present - one takes an
instance of
            * xmlrpc_c::method, the other
            * takes a xmlrpc_c::methodPtr, which wraps an
xmlrpc_c::method.
            */
            exists(MemberFunction m, Class c |
                c.getAMemberFunction( ) = m and
                c.getNamespace( ).getName( ) = "xmlrpc_c" and
                c.getName( ) = "registry" and
                m.getName( ) = "addMethod" and
                m.getACallToThisFunction( ) = this
            )
        }
        /**
        * The string use for this registration call.
        */
        string getRegistrationString( ) {
            exists(StringLiteral s | canStringValueFlow*(s,
getArgument(0)) and result = s.getValue( ))
        }
    }
```

The function "exists" returns all entries in the database that have the specified attributes. Thus, the class "XMLRPCRegistration( )" finds all functions that have attributes of XML RPC registration functions. That is, functions that have a class name of "registry" and a method name of "addMethod."

The function "getRegistrationString" returns the name used to register the target function.

The system identifies, in a first software element, an invocation of the target function using the remote procedure call (1130). To identify the invocation of the target function using the remote procedure call, the system can identify invocation functions of a remote procedure call framework. Each identified invocation with include, as an argument, a name associated with a registered target function.

The following example query identifies invocation functions of the XML RPC framework:

```
    /**
    * A call to an XML-RPC remote method.
    * <p>
    * Identifies calls the "call" method of xmlrpc_c::clientSimple,
which initiates a remote procedure
    * call.
    * </p>
    */
    class XMLRPCClientCall extends FunctionCall {
        XMLRPCClientCall( ) {
            exists(MemberFunction m, Class c |
                c.getAMemberFunction( ) = m and
                c.getNamespace( ).getName( ) = "xmlrpc_c" and
                c.getName( ) = "clientSimple" and
                m.getName( ) = "call" and
                m.getACallToThisFunction( ) = this
            )
        }
        string getMethodString( ) {
            exists(StringLiteral s |
                /*
                * Find the string used (if possible) for the "method"
argument.
                */
                canStringValueFlow*(s, getArgument(1)) and
                result = s.getValue( )
            )
        }
    }
```

The class "XMLRPCClientCall" finds all functions have the attributes of XML RPC invocation functions. That is, functions that have a class name of "clientSimple" and a method name of "call." The function "getMethodString" returns a string representing the registered name used by the invocation function.

The system identifies the target function of the remote procedure call in a second source code element (1140). For some RPC frameworks, any defined function is eligible to be a target of an RPC call. Thus, the system can identify locations where registered target functions are defined.

In some other RPC frameworks, the target functions are more explicitly defined. For example, in the XML RPC framework, target functions are defined in the code base by extending the xmlrpc_c::method class.

The following example query identifies functions that extend the xmlrpc_c::method class.

```
    /**
    * A class that extends (directly or indirectly) the
xmlrpc_c::method class, and represents a
    * possible target of a remote procedure call using XML-RPC.
    */
    class XMLRPCRemoteMethodClass extends Class {
        XMLRPCRemoteMethodClass( ) {
            /*
            * Possible targets of a remote method call are those classes
that extend the xmlrpc_c::method class.
            */
            exists(Class methodClass |
                methodClass.getNamespace( ).getName( ) = "xmlrpc_c" and
                methodClass.getName( ) = "method" | this.derivesFrom+(methodClass))
        }
        ...
    }
```

This query finds all functions having the namespace "xmlrpc_c" and the method name "method."

The system generates a new dependency between the first software element and the second software element (1150). The system can trace the invocation of a remote procedure call to the definition of the target function by matching (1) the names used in the invocations with names used in registrations, and (2) the target functions used in registrations with the definitions of those the target functions. The system can then define a new dependency between a first software element having the invocation and a second software element having the definition of the target function.

For example, in FIG. 12, the system can match (1) the name used in the invocation "rpc_call('rpc_sum')" to the name used in the registration "rpc register('rpc_sum', sum)," and (2) the target function of the registration "sum" to the definition of the target function in f.c 1230. The system can then define a dependency between main.c 1240 and f.c 1230.

The following example query identifies new dependencies in the XML RPC framework:

```
    class XMLRPCRemoteMethodClass extends Class {
        ...
        /**
        * Return registrations that use this method.
        */
        XMLRPCRegistration getRegistrationCall( ) {
            // Any registration call that uses a value representing this
method as the first argument.
            exists(ConstructorCall cc |
                cc.getTarget( ).getDeclaringType( ) = this and
                canMethodValueFlow*(cc, result.getArgument(1)))
        }
        /**
```

```
        * Return a FunctionCall that represents a call to this
RemoteMethod.
        */
        XMLRPCClientCall getACall( ) {
            /*
            * Find client calls where the first argument - representing
the name of the method to call -
            * is one of the strings that this RemoteMethod has been
registered with.
            */
            getRegistrationCall( ).getRegistrationString( ) =
result.getMethodString( )
        }
    }
```

This query identifies all target functions that are registered by an XML RPC registration and that are invoked with a registration string matching a registration string used in the registration.

After generating the new dependency, the raw dependency graph will reflect the implicit dependencies that arise in the system due to remote procedure calls. Likewise, the implicit dependencies will also be represented in the aggregated dependency graph.

This technique can also be used to identify errant RPC invocations that would not raise any compiler or linker errors. Because the string name used in the invocation is treated by the compiler and linker as a mere string argument, no errors would be generated even if the associated name was wrong.

By defining queries that match names used in registrations to names used in invocations, the system can execute queries to find RPC invocations that do not have any matching registrations. Similarly, the system can identify RPC registrations that do not have any matching invocations. These missing registrations and invocations are highly likely to be errors in the code, errors that may be difficult and costly to find otherwise through arduous debugging efforts. Thus, when defining implicit dependencies introduced by RPCs, the system can also generate a notification regarding missing registrations and invocations in the project.

Another category of implicit dependencies is dependencies introduced by run-time configuration files. For example, some graphical user interface (GUI) frameworks, including for Android OS, use configuration files that define user-interface elements that should be generated as well as corresponding actions that should be taken upon a user interacting with the user interface elements. The underlying OS will then invoke the appropriate methods at runtime.

Such runtime configuration files introduce implicit dependencies between the target functions that are invoked at runtime and the main program code. However, such dependencies will not be identified using only a static analysis of the structure of the source code, e.g., as reflected by compile-time or link-time dependencies for languages that are compiled and linked.

Figure 13:
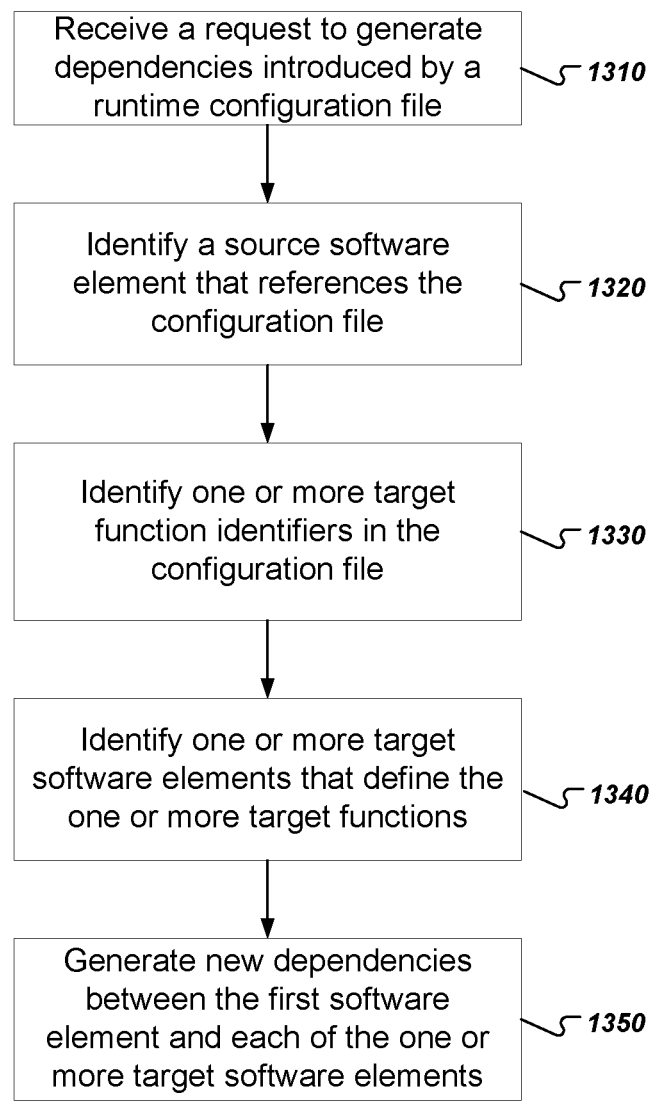
FIG. 13 is a flow chart of an example process for identifying implicit dependencies introduced by runtime configuration files.

FIG. 13 is a flow chart of an example process for identifying implicit dependencies introduced by runtime configuration files. The system will generate a dependency between a source software element that references a configuration file identifying a target function to a target source element that defines the target function. The process will be described as being performed by an appropriately programmed system of one or more computers, e.g., the dependency engine 230 of FIG. 2.

The system receives a request to generate dependencies introduced by a runtime configuration file in a project (1310). The request can be a user-defined query designed to identify a new dependency category for implicit dependencies generated by runtime configuration files.

The system identifies a source software element that references the configuration file (1320). The source software element will generally be a source code file that includes a call to a function that references the configuration file. For example, in the GUI example, the source software element can invoke a function that references the layout configuration file.

Figure 14:
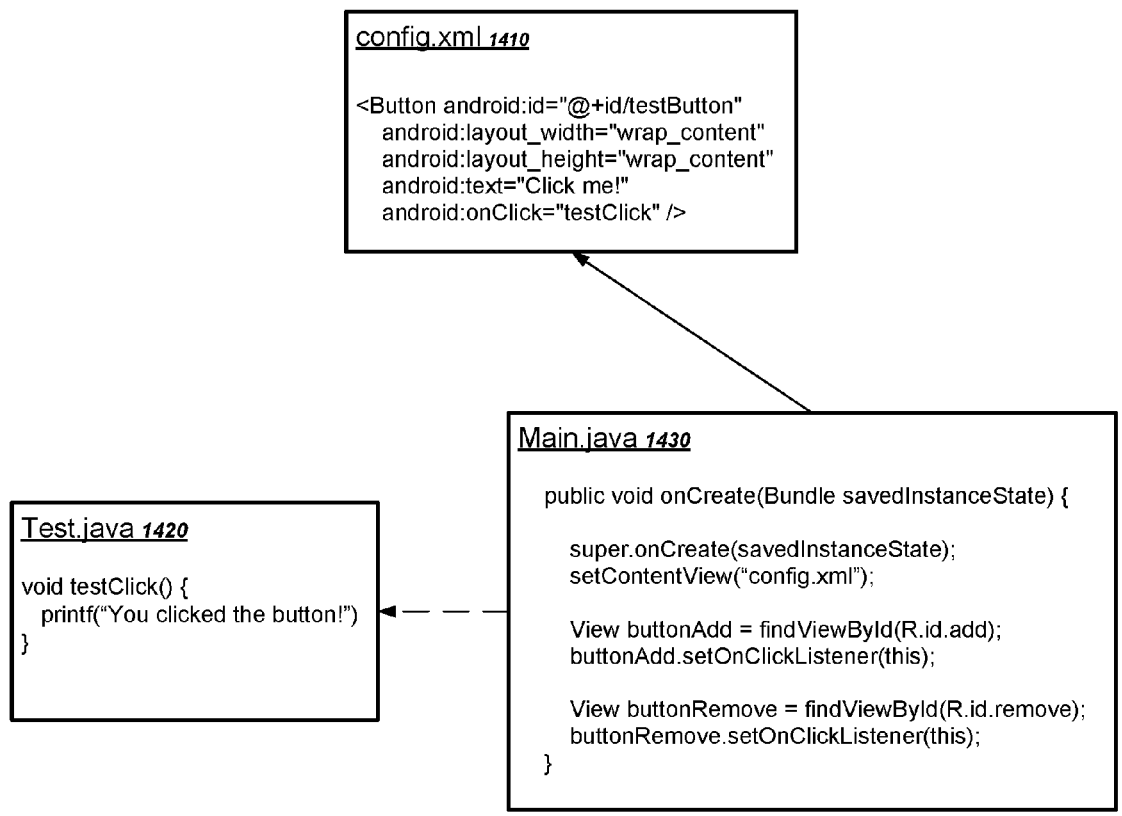
FIG. 14 illustrates a software element that references a runtime configuration file.

FIG. 14 illustrates a software element that references a runtime configuration file. The file main.java 1430 extends a standard Android "Activity" class by implementing its own "onCreate" method with the following example code:

```
public void onCreate(Bundle savedInstanceState) {
    super.onCreate(savedInstanceState);
    setContentView("config.xml");
    View buttonAdd = findViewById(R.id.add);
    buttonAdd.setOnClickListener(this);
    View buttonRemove = findViewById(R.id.remove);
    buttonRemove.setOnClickListener(this);
}
```

The line "setContentView("config.xml")" references the file config.xml 1410. In an actual application, the source code may actually reference the configuration file in other ways than simply naming it. For example, the code can assign an integer identifier to the configuration file, and the "setContentView" function can specify the integer identifier of the configuration file.

The following code is an example query for identifying calls to "setContentView" in source code, as well as identifying the configuration files that are referenced in calls to "setContentView."

```
/* Identify whether a class c inflates a layout file 1 */
predicate inflatesLayout(Class c, MethodCall m, LayoutFile l) {
    /* Determination requires that c contains a call to
    /* Activity.setContentView that passes the ID of the layout file
    */
    exists(int id | m.getScope+( ) = c and m.getName =
"Activity.setContentView" and m.getArgumentByPosition(1) = id
    and l.getId( ) = id )
}
```

As shown in FIG. 13, the system identifies one or more target function identifiers in the configuration file (1330). The system can parse configuration files during a build process and update the database with attributes of the configuration files in a similar way that the system updates the database with attributes of source code files. The system can then query the database for attributes of the configuration files to identify target functions.

For example, the configuration file config.xml 1410 specifies the behavior of clicking a button in a GUI of the Android OS using the following example XML code:

```
<Button android:id="@+id/testButton"
    android:layout_width="wrap_content"
    android:layout_height="wrap_content"
    android:text="Click me!"
    android:onClick="testClick" />
```

The last line of the example XML code identifies a target function "testClick" that is called when the button is clicked.

The system can parse this example XML file with the following example query that identifies Button nodes and their corresponding target functions.

```
/* Class that identifies Button nodes in Layout XML files. */
class LayoutButton extends LayoutFileXMLNode {
    LayoutButton( ) {
        this.hasName("Button")
    }
    String getOnClickMethodName( ) {
        result = getAttribute("android:onClick").getValue( )
    }
}
```

The system identifies one or more target software elements that define the one or more target functions (1340). For each of the target function identifiers, the system can query the database to identify target software elements that include the definitions of the target functions.

The system generates new dependencies between the first software element each of the one or more target software elements (1350). In FIG. 14, for example, the system can generate a dependency represented by the dashed arrow from the file Main.java 1430 and Test.java 1420 that defines the "testClick" method.

The system adds the dependency between Main.java 1430 and Test.java 1420 even though no source code of Main.java 1430 references any elements of Test.java 1420.

The following example query can be used to generate a new dependency between Main.java 1430 and Test.java 1420.

```
/* Select dependencies from calls to Activity.setContentView to all
the on-click methods that must exist in order for the inflation to be
valid. */
    from MethodCall inflaterCall, MethodDefinition onClickMethod
    where exists(Class c, LayoutFile l | inflatesLayout(c, inflaterCall,
1) and l.getAnXMLNode( ).(LayoutButton).getOnClickMethodName( ) =
onClickMethod.getName( )
    select inflaterCall, onClickMethod
```

One further type of implicit dependency is an implicit dependency between configuration files, i.e., a "configuration file to configuration file dependency." For example, in the Spring framework, one spring.xml file can include another. The definition of a Spring bean in one file may reference the definition of a Spring bean in another. In Maven and other build systems—a Maven "pom.xml" file can depend on another "pom.xml" file.

These configuration file dependencies can tie together projects and packages in unexpected ways that are not reflected in the source code itself. Thus, the system can use query-based dependencies to define a new category of dependency for configuration file dependencies. These dependencies can then be aggregated into the aggregated dependency graph and displayed to a user.

Another category of implicit dependencies is dependencies introduced by reflection frameworks. Reflection frameworks are software libraries that allow a program to inspect its own contents at runtime. An implicit reflection dependency exists when a first software element uses a software element name to refer to another software element through a reflection framework. Importantly, the name of the software element is resolved by the reflection framework at runtime. Thus, in order to generate implicit dependencies from reflection frameworks, the system can emulate the behavior of calls to some reflection functions.

Figure 15:
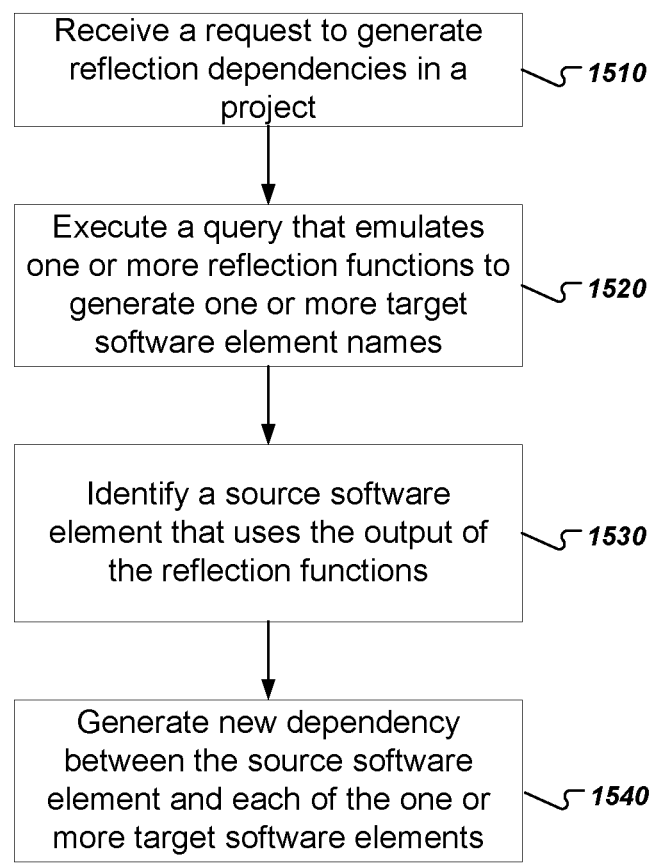
FIG. 15 is a flow chart of an example process for identifying implicit dependencies introduced by reflection functions.

FIG. 15 is a flow chart of an example process for identifying implicit dependencies introduced by reflection functions. The system will emulate the behavior of a particular reflection function to obtain target function names and then generate dependencies between a software element that invokes the reflection function and software elements that define the target functions. The process will be described as being performed by an appropriately programmed system of one or more computers, e.g., the dependency engine 230 of FIG. 2.

The system receives a request to generate reflection dependencies in a project (1510). For example, a user can supply a user-defined query for identifying reflection dependencies in a project that uses reflection functions.

The system executes a query that emulates one or more reflection functions to generate one or more target software element names (1520). Rather than actually executing the software, a static analysis system can instead emulate the behavior of the reflection functions to infer its run-time behavior. The static analysis system need not emulate the behavior of the reflection functions perfectly. Rather, a minimal functionality is typically sufficient in order to generate implicit dependencies.

Two example reflection functions include functions that generate all class names having a particular attribute, and to generate all class names having a particular annotation. For example, the following source code uses a reflections library to generate two sets: (1) a first set that includes all class names that are sub-types of SomeType, and (2) a second set that includes all classes that are annotated with SomeAnnotation.

```
Reflections reflections = new Reflections("my.project.prefix");
    Set<Class<? extends SomeType>> subTypes =
reflections.getSubTypesOf(SomeType.class);
    Set<Class<?>> annotated =
reflections.getTypesAnnotatedWith(SomeAnnotation.class);
```

One example use for this functionality is a help menu for a program invoked at the command line. Instead of hard coding help menu for a particular command line program, the program can instead use reflection functions to generate a list of classes having a particular annotation, which represent commands that are available from the command line and their corresponding descriptions. This functionality allows developers to add new classes to the program without changing the code that generates the help menu.

The system could then execute a query that emulated the behavior of the reflection functions, which would output the names of the classes having the corresponding annotation.

The system identifies a source software element that uses the output of the reflection functions (1530). In the help menu example, such reflection functions above might be used to generate the help menu as follows:

```
for(Class<?> c : intersection(subTypes, annotated))
    helpText.append((String)getStaticMethod(c,
 'getDescription').invoke( ));
```

The system generates a new dependency between the source software element and each of the one or more target software elements (1540). In this example, the software element that included the enumeration of the help menu functions would have a dependency on each software element that included one of the enumerated classes.

The following are example queries that generate such dependencies:

```
/* Class representing calls to methods that imply reflective access.
*/
    class ReflectiveAccess extends MethodCall {
        ReflectiveAccess( ) {
            getName( ) = "Reflection.Package.getStaticMethod"
        {
        /* Get a possible Type that might be the target of the reflective
access. */
        Type getAReflectedType( ) {
            exists(Variable c | c = getArgumentByPosition(1) and result =
c.getPossibleValue( ))
        }
    }
    /* Select dependencies from reflective accesses to the actual
methods accessed. */
        from ReflectiveAccess r, Method m
        where m.getDeclaringClass( ) = r.getAReflectedType( )
        select r,m
```

Another category of implicit dependencies arises from callback registration. A callback registration involves a function pointer being passed to another module. At certain points in the execution of the module, the module will call the callback function.

A callback registration is an implicit dependency because the module using the callback function may not have, at compile time or link time, any statements that reference anything in the software element that defines the callback.

Figure 16:
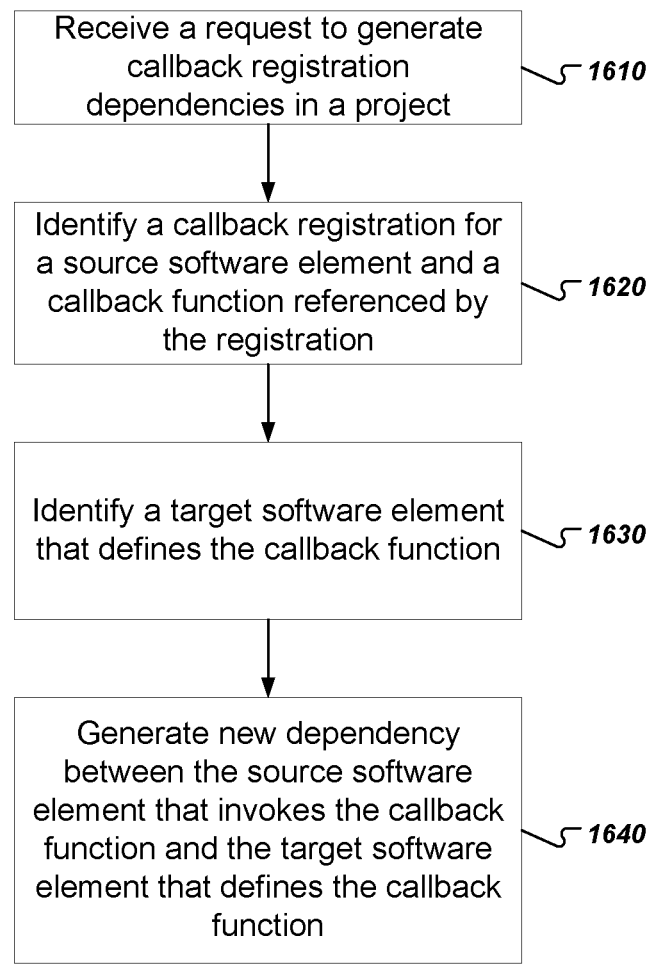
FIG. 16 is a flow chart of an example process for identifying implicit dependencies introduced by callback registration.

FIG. 16 is a flow chart of an example process for identifying implicit dependencies introduced by callback registration. The system will generate a new dependency by matching a name of a target function referenced by a callback registration for a source software element to a target software element. The process will be described as being performed by an appropriately programmed system of one or more computers, e.g., the dependency engine 230 of FIG. 2.

The system receives a request to generate callback registration dependencies in a project (1610). For example, a user can supply a user-defined query for identifying callback registration dependencies in a project that uses callback registrations.

The system identifies a callback registration for a source software element and a callback function referenced by the registration (1620). For example, the user-specified query can be customized to find callback registrations in a particular callback framework.

Figure 17:
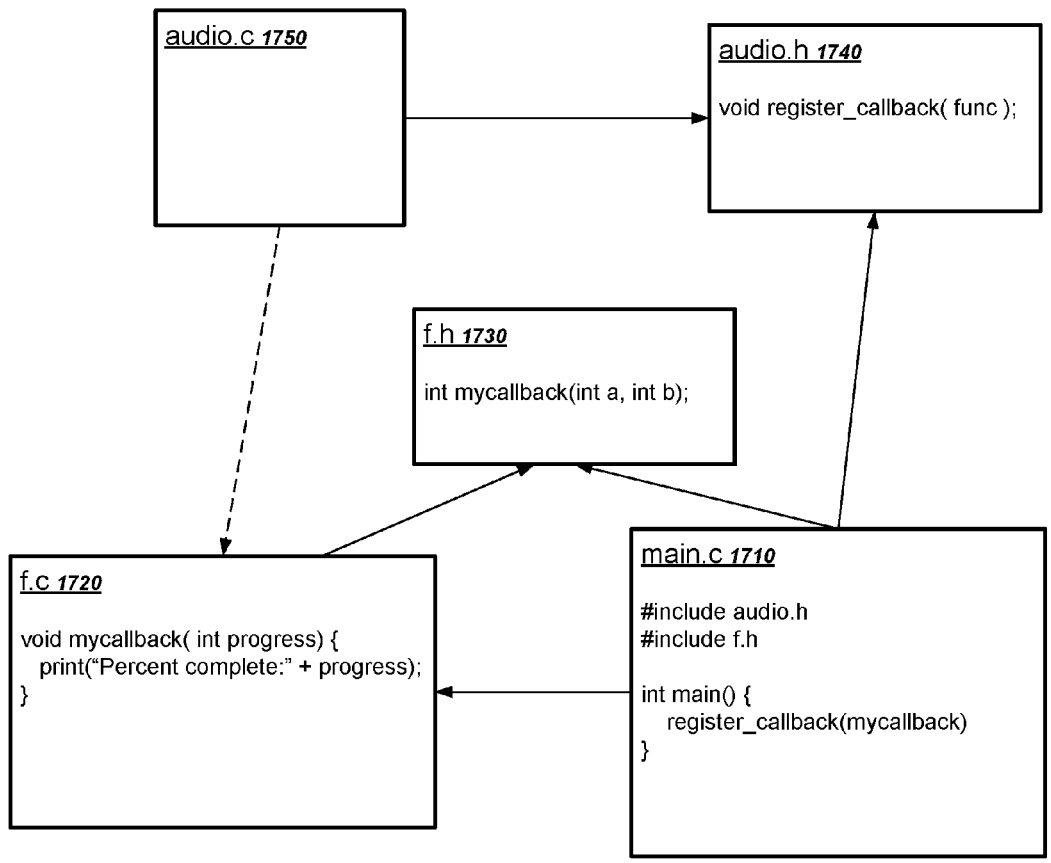
FIG. 17 illustrates example pseudocode source files that use a callback registration.

FIG. 17 illustrates example pseudocode source files that use a callback registration. The callback function "mycallback" is defined in f.c 1720. In the file main.c 1710, a callback is registered with an audio module audio.c 1730. For example, the audio module could be a module that calls a callback function at certain times while processing an audio stream.

The file main.c 1710 includes a link-time dependency on f.c 1720. However, at neither compile time nor link time are there any dependencies between audio.c 1730 and f.c 1720.

The system identifies a target software element that defines the callback function (1630). In FIG. 17, for example, the file f.c 1720 defines the callback function.

The system generates a new dependency between the source software element that invokes the callback function and the target software element that defines the callback function (1640). In FIG. 17, for example, the system can generate a dependency between the file audio.c 1730 and the file f.c 1720.

Another category of implicit dependencies arises from dependency injection. A dependency injection framework is a software tool that allows a developer to specify relationships between classes and instances of the classes. This allows the class definitions to remain generic by not explicitly depending on other class definitions in the source code. For example, an instance of a first class can be "injected" into a constructor or into a setter method of another class by using a configuration file. The source code itself shows no dependency between the two classes.

Figure 18:
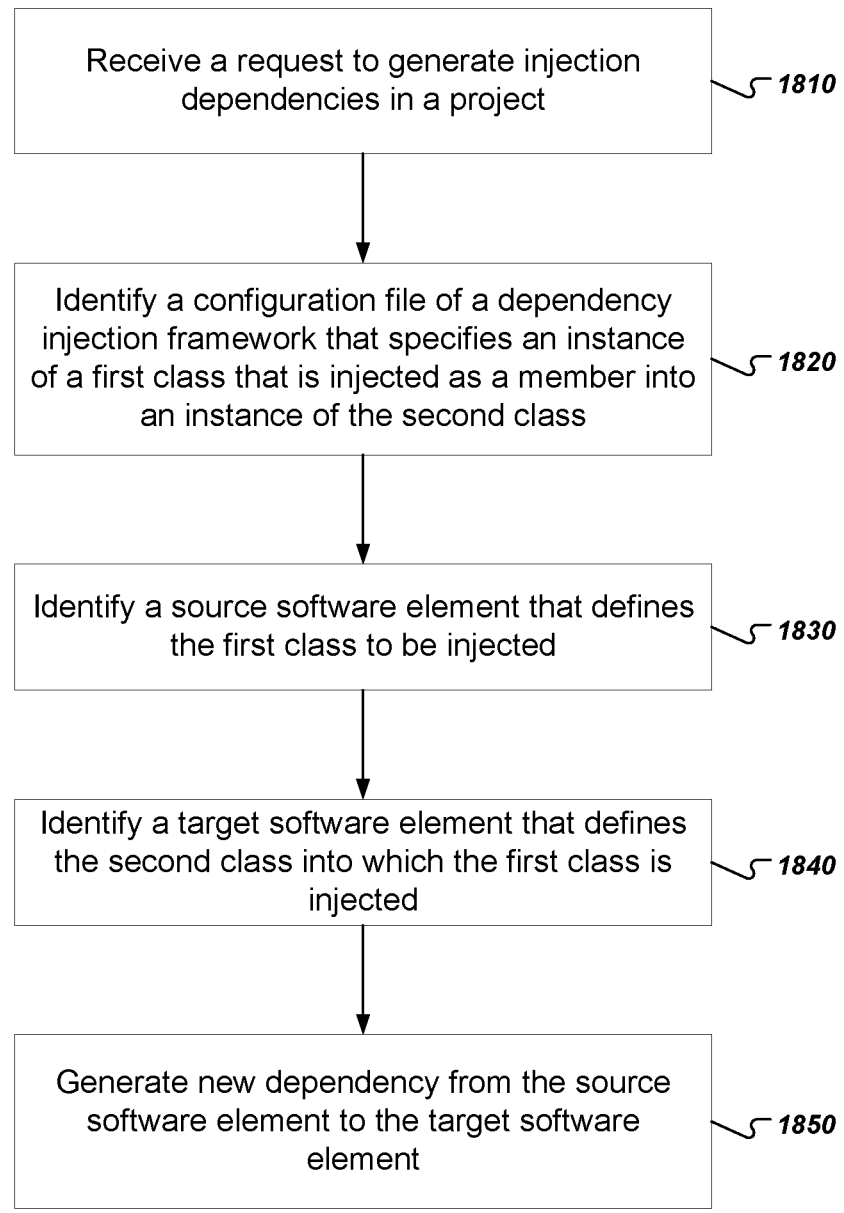
FIG. 18 is a flow chart of an example process for identifying implicit dependencies introduced by dependency injection.

FIG. 18 is a flow chart of an example process for identifying implicit dependencies introduced by dependency injection. The process will be described as being performed by an appropriately programmed system of one or more computers, e.g., the dependency engine 230 of FIG. 2.

The system receives a request to generate injection dependencies in a project (1810). For example, the system can receive a user-defined query that identifies injected dependencies for a particular programming language or a particular project.

The system identifies a configuration file of a dependency injection framework that specifies an instance of a first class that is injected as a member into an instance of the second class (1820). Because the dependency injection framework uses the configuration file to instantiate the classes, the actual source code of the project does not reference an instance of a first class being used by a second class. Although this example makes specific reference to a configuration file, the same techniques can be applied to dependency injection frameworks that use source code annotations rather than configuration files.

The following example configuration file of the Spring dependency injection framework defines a first class, "RadioMessenger," that is injected into a second class "WeatherStation" using the constructor of the second class.

```
<beans xmlns="http://www.springframework.org/schema/beans"
    xmlns:xsi="http://www.w3.org/2001/XMLSchema-instance"
    xmlns:context="http://www.springframework.org/schema/context"
xsi:schemaLocation="http://www.springframework.org/schema/beans
    http://www.springframework.org/schema/beans/spring-beans.xsd">
    <bean id="messenger" class="com.test.RadioMessenger"/>
    <bean id="weatherStation" class="com.test.WeatherStation">
        <constructor-arg ref="messenger" />
    </bean>
</beans>
```

The WeatherStation class is instantiated by referencing the configuration file. For example, the following example source code identifies the configuration file "services.xml" and uses the information in services.xml to instantiate a WeatherStation object:

```
    public static void main(String[ ] args) {
        ApplicationContext context = new
    ClassPathXmlApplicationContext("services.xml");
        WeatherStation weatherStation =
            context.getBean(WeatherStation.class);
        weatherStation.sendReport( );
    }
```

In this example, the definition of the WeatherStation class makes reference only to a generic "Messenger" interface, both of which are defined in the following example source code:

```
interface Messenger {
    void sendMessage(String message);
}
class WeatherStation {
    private final Messenger m;
    public WeatherStation(Messenger messenger) {
        this.m = messenger;
    }
    public void sendReport( ) {
        Report r = getReport( );
        this.m.sendMessage(r.toString( ));
    }
    private Report getReport( ) {
        // Read weather sensors
        ...
    }
}
```

The RadioMessenger class specified in the configuration file extends the generic interface Messenger class, for example, using the following source code:

```
class RadioMessenger extends Messenger {
    void sendMessage(String message) {
        sendRadioMessage( message )
    }
}
```

Figure 19:
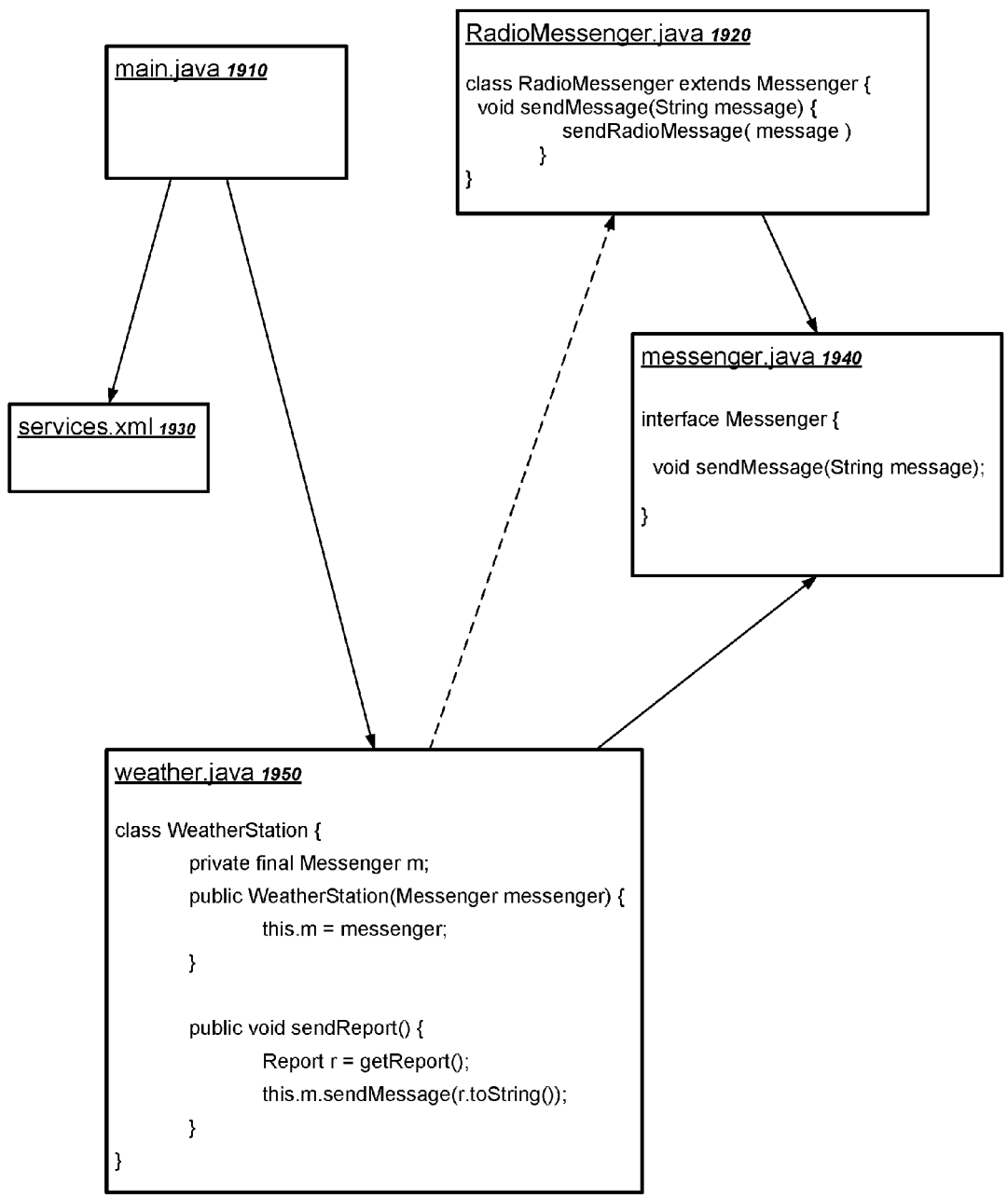
FIG. 19 illustrates example source code files and a dependency injection configuration file.

FIG. 19 illustrates example source code files and a dependency injection configuration file. As shown, weather.java 1950 and RadioMessenger.java 1920 both depend on the file messenger.java 1940. And the file main.java 1910 depends on weather, java 1950 and the configuration file services.xml 1930.

However, no compile-time or link-time dependencies exist between Weather.java 1950 and RadioMesssenger.java 1920 because the code of Weather.java 1950 does not make any reference to any software elements in RadioMessenger-.java 1920.

As shown in FIG. 18, the system identifies a source software element that defines the first class to be injected (1830). In this example, the file RadioMessenger.java 1920 defines the first class to be injected.

The system identifies a target software element that defines the second class into which the first class is injected (1840). In this example, the file weather.java 1950 defines a class into which the RadioMessenger instance is injected.

The system generates a new dependency from the source software element to the target software element (1850). As shown in FIG. 19, the system generates an implicit dependency between the file weather.java and the file RadioMessenger.java.

The following is an example query for identifying an injected dependency using the Spring framework.

```
from Constructor constructor, SpringBean bean, RefType type
where constructor = constructorCalledByBean(bean) and
exists(SpringConstructorArg arg |
    bean.getAConstructorArg( ) = arg and
    // The constructor depends on the type of the referenced bean
    type = arg.getArgRefBean( ).getClass( )
)
select constructor, type
```

This example query returns a constructor and a type. In other words, the query identifies a type, an instance of which will be injected into the given constructor. In other words, the query identifies a constructor that is used to construct a Spring bean. For that constructor, the query identifies which arguments are defined in the Spring configuration file, and follows the links to determine what type that argument has. In the example, the constructor argument is given as a reference to the bean with id "messenger." Looking for the definition of the bean with id "messenger", we see it is of type "RadioMessenger", so we can deduce that the argument of the WeatherStation constructor is an instance of RadioMessenger.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a request to generate implicit dependencies introduced by a reflection function in a project, wherein a reflection function is a function by which a program accesses attributes of the program's own source code;
   executing a query that emulates at least some behavior of the reflection function to generate names of one or more target software elements that the reflection function outputs at runtime;

identifying, in the project, a source software element that uses output of the reflection function;

generating, in a raw dependency graph, one or more respective new dependencies representing one or more implicit dependencies of the source software element on each of the one or more target software elements due to the source software element using the output of the reflection function to obtain respective names of the one or more target software elements at runtime; and generating data representing an aggregated dependency graph for a plurality of nodes of a hierarchy graph of software elements in the project, the plurality of nodes comprising a first node and one or more second nodes, wherein the aggregated dependency graph is different from the raw dependency graph, including generating one or more respective aggregated dependencies between the first node in the hierarchy graph and each of the one or more second nodes in the hierarchy graph, each aggregated dependency respectively representing the one or more implicit dependencies in the raw dependency graph of the source software element on each of the one or more target software elements, wherein, for each aggregated dependency on a particular second node of the one or more second nodes, the first node or a descendant of the first node in the hierarchy graph represents the source software element and the particular second node or a descendant of the particular second node in the hierarchy graph represents a particular target software element of the one or more target software elements.

2. The method of claim 1, further comprising:
presenting a dependency graph that includes the one or more new dependencies between the source software element and each of the one or more target software elements.

3. The method of claim 1, wherein generating the one or more new dependencies comprises matching a name of a target function output at runtime by the reflection function with a definition of the target function in a target software element.

4. The method of claim 1, wherein the implicit dependency is a dependency from a source software element to a target software element such that building the source software element would not cause a compile-time or link-time error due to an absence of the target software element.

5. The method of claim 1, further comprising providing a user interface presentation that presents the aggregated dependency graph.

6. The method of claim 1, wherein receiving the request to generate implicit dependencies introduced by a reflection function in a project comprises receiving a query that defines an implicit dependency introduced by the reflection function in the project.

7. The method of claim 5, wherein the user interface presentation visually distinguishes the implicit dependencies introduced by time configuration files from other dependencies in the user interface presentation.

8. A system comprising:
one or more computers and one or more storage devices storing instructions that are operable, when executed by the one or more computers, to cause the one or more computers to perform operations comprising:
receiving a request to generate implicit dependencies introduced by a reflection function in a project, wherein a reflection function is a function by which a program accesses attributes of the program's own source code;

executing a query that emulates at least some behavior of the reflection function to generate names of one or more target software elements that the reflection function outputs at runtime;

identifying, in the project, a source software element that uses output of the reflection function;

generating, in a raw dependency graph, one or more respective new dependencies representing one or more implicit dependencies of the source software element on each of the one or more target software elements due to the source software element using the output of the reflection function to obtain respective names of the one or more target software elements at runtime; and generating data representing an aggregated dependency graph for a plurality of nodes of a hierarchy graph of software elements in the project, the plurality of nodes comprising a first node and one or more second nodes, wherein the aggregated dependency graph is different from the raw dependency graph, including generating one or more respective aggregated dependencies between the first node in the hierarchy graph and each of the one or more second nodes in the hierarchy graph, each aggregated dependency respectively representing the one or more implicit dependencies in the raw dependency graph of the source software element on each of the one or more target software elements, wherein for each aggregated dependency on a particular second node of the one or more second nodes, the first node or a descendant of the first node in the hierarchy graph represents the source software element and the particular second node or a descendant of the particular second node in the hierarchy graph represents a particular target software element of the one or more target software elements.

9. The system of claim 8, wherein the operations further comprise:
presenting a dependency graph that includes the one or more new dependencies between the source software element and each of the one or more target software elements.

10. The system of claim 8, wherein generating the one or more new dependencies comprises matching a name of a target function output at runtime by the reflection function with a definition of the target function in a target software element.

11. The system of claim 8, wherein the implicit dependency is a dependency from a source software element to a target software element such that building the source software element would not cause a compile-time or link-time error due to an absence of the target software element.

12. The system of claim 8, wherein the operations further comprise providing a user interface presentation that presents the aggregated dependency graph.

13. The system of claim 8, wherein receiving the request to generate implicit dependencies introduced by a reflection function in a project comprises receiving a query that defines an implicit dependency introduced by the reflection function in the project.

14. The system of claim 12, wherein the user interface presentation visually distinguishes the implicit dependencies introduced by runtime configuration files from other dependencies in the user interface presentation.

15. A computer program product, encoded on one or more non-transitory computer storage media, comprising instructions that when executed by one or more computers cause the one or more computers to perform operations comprising:

receiving a request to generate implicit dependencies introduced by a reflection function in a project, wherein a reflection function is a function by which a program accesses attributes of the program's own source code;

executing a query that emulates at least some behavior of the reflection function to generate names of one or more target software elements that the reflection function outputs at runtime;

identifying, in the project, a source software element that uses output of the reflection function; and generating, in a raw dependency graph, one or more respective new dependencies representing one or more implicit dependencies of the source software element on each of the one or more target software elements due to the source software element using the output of the reflection function to obtain respective names of the one or more target software elements at runtime; and generating data representing an aggregated dependency graph for a plurality of nodes of a hierarchy graph of software elements in the project, the plurality of nodes comprising a first node and one or more second nodes, wherein the aggregated dependency graph is different from the raw dependency graph, including generating one or more respective aggregated dependencies between the first node in the hierarchy graph and each of the one or more second nodes in the hierarchy graph, each aggregated dependency respectively representing the one or more implicit dependencies in the raw dependency graph of the source software element on each of the one or more target software elements, wherein for each aggregated dependency on a particular second node of the one or more second nodes, the first node or a descendant of the first node in the hierarchy graph represents the source software element and the particular second node or a descendant of the particular second node in the hierarchy graph represents a particular target software element of the one or more target software elements.

16. The computer program product of claim 15, wherein the operations further comprise:

presenting a dependency graph that includes the one or more new dependencies between the source software element and each of the one or more target software elements.

17. The computer program product of claim 15, wherein generating the one or more new dependencies comprises matching a name of a target function output at runtime by the reflection function with a definition of the target function in a target software element.

18. The computer program product of claim 15, wherein the implicit dependency is a dependency from a source software element to a target software element such that building the source software element would not cause a compile-time or link-time error due to an absence of the target software element.

19. The computer program product of claim 15, wherein the operations further comprise providing a user interface presentation that presents the aggregated dependency graph.

20. The computer program product of claim 15, wherein receiving the request to generate implicit dependencies introduced by a reflection function in a project comprises receiving a query that defines an implicit dependency introduced by the reflection function in the project.

21. The computer program product of claim 19, wherein the user interface presentation visually distinguishes the implicit dependencies introduced by runtime configuration files from other dependencies in the user interface presentation.

* * * * *

UNITED STATES PATENT AND TRADEMARK OFFICE
CERTIFICATE OF CORRECTION

PATENT NO. : 9,678,721 B2  
APPLICATION NO. : 15/090468  
DATED : June 13, 2017  
INVENTOR(S) : Joshua George Hale et al.

It is certified that error appears in the above-identified patent and that said Letters Patent is hereby corrected as shown below:

In the Claims

Column 41, Line 57, in Claim 7, delete "time" and insert -- runtime --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*